US012427722B2

(12) United States Patent
Baertschi et al.

(10) Patent No.: US 12,427,722 B2
(45) Date of Patent: Sep. 30, 2025

(54) METHOD OF ADDITIVELY MANUFACTURING A MINIMAL SURFACE STRUCTURE

(71) Applicant: spherene AG, Zürich (CH)

(72) Inventors: Ralph Baertschi, Zürich (CH); Christian Waldvogel, Zürich (CH); Rasmus Joergensen, Zürich (CH)

(73) Assignee: spherene AG, Zürich (CH)

( * ) Notice: Subject to any disclaimer, the term of this patent is extended or adjusted under 35 U.S.C. 154(b) by 311 days.

(21) Appl. No.: 17/924,495

(22) PCT Filed: May 15, 2020

(86) PCT No.: PCT/EP2020/063727
§ 371 (c)(1),
(2) Date: Nov. 10, 2022

(87) PCT Pub. No.: WO2020/229692
PCT Pub. Date: Nov. 19, 2020

(65) Prior Publication Data
US 2023/0182396 A1     Jun. 15, 2023

(51) Int. Cl.
*B33Y 50/02*     (2015.01)
*B29C 64/386*     (2017.01)
(Continued)

(52) U.S. Cl.
CPC .......... *B29C 64/386* (2017.08); *B29C 64/393* (2017.08); *B33Y 10/00* (2014.12);
(Continued)

(58) Field of Classification Search
CPC .................................................... B33Y 50/02
See application file for complete search history.

(56) References Cited

U.S. PATENT DOCUMENTS

| 6,133,921 A | 10/2000 | Turkiyyah et al. |
| 2013/0127857 A1 | 5/2013 | Carr et al. |

(Continued)

FOREIGN PATENT DOCUMENTS

| CN | 104156997 A | 11/2014 |
| CN | 105183405 A | 12/2015 |

(Continued)

OTHER PUBLICATIONS

Feng et al. "A review of the design methods of complex topology structures for 3D printing", Visual Computing for Industry, Biomedicine, and Art, 2018, vol. 1:5, pp. 1-16.
(Continued)

*Primary Examiner* — Suresh Suryawanshi
(74) *Attorney, Agent, or Firm* — The Webb Law Firm

(57) ABSTRACT

A method of additively manufacturing a minimal surface structure of a three-dimensional article includes a computer executing the steps of recording, in the computer, an envelope of the three-dimensional article; generating a density field across a volume enclosed by the envelope with densities of the density field corresponding to local requirement values of at least one physical parameter at respective positions of the three-dimensional article; generating an adaptive Voronoi tessellation of the volume using the density field; generating a first skeleton graph associated with the adaptive Voronoi tessellation; generating a second skeleton graph associated with the first skeleton graph; and generating a digital minimal surface model from the first and second skeleton graphs. The method may further include a 3D printer additively manufacturing the minimal surface structure according to the digital minimal surface model.

19 Claims, 19 Drawing Sheets

(51) Int. Cl.
  *B29C 64/393* (2017.01)
  *B33Y 10/00* (2015.01)
  *B33Y 50/00* (2015.01)
  *B33Y 80/00* (2015.01)
  *G06F 30/17* (2020.01)
  *G06F 30/23* (2020.01)
  *G06F 113/10* (2020.01)

(52) U.S. Cl.
  CPC ............... *B33Y 50/00* (2014.12); *B33Y 50/02* (2014.12); *B33Y 80/00* (2014.12); *G06F 30/17* (2020.01); *G06F 30/23* (2020.01); *G06F 2113/10* (2020.01)

(56) References Cited

U.S. PATENT DOCUMENTS

| | | | |
|---|---|---|---|
| 2014/0014493 A1* | 1/2014 | Ryan | B01D 53/185 203/49 |
| 2020/0023584 A1 | 1/2020 | Portela et al. | |
| 2020/0033070 A1* | 1/2020 | Vlahinos | B01F 25/43231 |
| 2022/0003503 A1* | 1/2022 | Iyer | B01D 69/10 |
| 2022/0275845 A1* | 9/2022 | Kabaria | B29C 64/35 |

FOREIGN PATENT DOCUMENTS

| | | | | |
|---|---|---|---|---|
| CN | 110008529 A | | 7/2019 | |
| CN | 111695259 A | * | 9/2020 | ............. G06F 30/20 |
| RU | 2308763 C2 | | 10/2007 | |
| RU | 2444788 C2 | | 3/2012 | |
| WO | WO-2015056253 A1 | * | 4/2015 | ............. B23K 26/08 |
| WO | 2019062346 A1 | | 4/2019 | |

OTHER PUBLICATIONS

Mao, "A new hybrid adaptive mesh algorithm based on Voronoi tessellations and equi-distribution principle: Algorithms and numerical experiments", Computer & Fluids, 2015, vol. 109, pp. 137-154.
Schoen, "Infinite Periodic Minimal Surfaces Without Self-Intersections", National Aeronautics and Space Administration, 1970, pp. 1-100.
Yan et al. "Strong 3D Printing by TPMS Injection", IEEE Transactions on Visualization and Computer Graphics, 2020, pp. 1-14.

* cited by examiner

E
E
E
E

METHOD OF ADDITIVELY MANUFACTURING A MINIMAL SURFACE STRUCTURE

CROSS-REFERENCE TO RELATED APPLICATION

This application is the United States national phase of International Application No. PCT/EP2020/063727 filed May 15, 2020, the disclosure of which is hereby incorporated by reference in its entirety.

BACKGROUND

Field

Non-limiting embodiments or aspects of the present disclosure relate to a method of additively manufacturing a minimal surface structure of a three-dimensional article and a minimal surface structure additively manufactured by said method.

Description of Related Art

Additive manufacturing is a manufacturing technology where articles are made from digital three-dimensional models by building the article through typically layer-by-layer addition of material. The manufacturing additive processes provide a significantly increased freedom of design and allow to produce highly complex shapes and geometries, compared to conventional e.g. subtractive manufacturing processes. A prerequisite for producing a three-dimensional article by additive manufacturing may be a digital three-dimensional model or a computer-aided design file according to which the article can be additively manufactured by a 3D printer.

Current additive manufacturing processes rely, for filling the interior of hollowed-out objects, on tubular scaffolds or, in elaborate cases, on triply periodic minimal surface (TPMS) infill structures. The generation of triply periodic minimal surfaces without self-intersections using a pair of periodic skeleton graphs was described in the NASA technical report NASA TN D-5541 of Alan H. Schoen. A self-intersection-free triply periodic minimal surface generated from a pair of skeleton graphs divides the space into two disjoint labyrinthine regions. According to Schoen, the triply periodic minimal surface can conceptually be described to be generated by simultaneously inflating tubular neighborhoods around the skeletal graphs, where the triply periodic minimal surface emerges when the two inflationary regions collide.

Minimal surfaces, such as TPMS, allow for advantageous force flow and distribution of loads. In case of conventional periodic minimal surfaces, however, the high symmetry due to the periodicity leads to preferred directions in the structure which reduces overall response to physical requirements such as stress or strain due to the preferred directions given by the symmetries. Further, conventional periodic minimal surfaces such as TPMS exhibit poor ability to adapt to bounding geometry or requirements like specific boundary conditions.

SUMMARY

Non-limiting embodiments or aspects of the present disclosure provide an improved method of additively manufacturing a minimal surface structure of a three-dimensional article and a minimal surface structure additively manufactured by said method.

According to some non-limiting embodiments or aspects, provided is a method of additively manufacturing a minimal surface structure of a three-dimensional article, the method comprising a computer executing the steps of: recording in the computer an envelope of the three-dimensional article; generating a density field across a volume enclosed by the envelope with densities of the density field corresponding to local requirement values of at least one physical parameter at respective positions of the three-dimensional article; generating an adaptive Voronoi tessellation of the volume using the density field; generating a first skeleton graph associated with the adaptive Voronoi tessellation; generating a second skeleton graph associated with the first skeleton graph; generating a digital minimal surface model from the first and second skeleton graphs; wherein the method further comprises a 3D printer additively manufacturing the minimal surface structure according to the digital minimal surface model.

The envelope of the three-dimensional article may be an article envelope representing the outer boundary of the article. In order to reduce processing power when generating the digital minimal surface model, a so-called density field envelope representing a simplified article envelope with a simplified geometry may be used as the envelope of the three-dimensional article. Preferably, the article envelope is fully contained within the density field envelope. For example, a density field envelope in the shape of a polygonal prism and enclosing an article envelope in the shape of a cylinder may be used. In a further example, a density field envelope in the shape of a n-polygonal prism and enclosing an article envelope in the shape of a m-polygonal prism, where m>n, may be used.

The adaptive Voronoi tessellation described in the context of non-limiting embodiments or aspects of the present disclosure may be understood as a 3D Voronoi tessellation using three-dimensional Voronoi cells. The term "adaptive" may indicate that the adaptive Voronoi tessellation is adaptable to the characteristics of the density field, as described herein.

The first and second skeleton graphs are preferably intertwining without intersecting each other. For example, the second skeleton graph may be based on a dual graph of the first skeleton graph. Further, the second skeleton graph may be based on a dual tessellation of the Voronoi tessellation, such as a 3D-Delaunay triangulation or Delaunay tetrahedralization, respectively, as described further below. The second skeleton graph may therefore be essentially dual to the first skeleton graph. The second skeleton graph, however, may feature one or more corrected segments which deviate from the dual graph of the first skeleton graph in order to adapt to local topological conditions as described further below. Optionally, the first skeleton graph may feature one or more corrected segments which deviate from the dual relationship to the second skeleton graph in order to adapt to local topological conditions. By using the two skeleton graphs to generate the digital minimal surface model, two disjoint labyrinths, each originating from a skeleton graph, can be generated which are separated by the wall of the minimal surface structure. By the generation of the two labyrinths, two channels of the minimal surface structure can be obtained. The channels may be closed by closures on peripheral openings of the channels or left open.

By generating the density field, a spatial mapping of local requirement values of at least one physical parameter can be obtained, as the densities of the density field at respective positions of the article correspond to the local requirement values of the at least one physical parameter at said respective positions. For example, the density field can represent a spatial mapping of load case requirements parametrized by physical parameters such as stress and/or strain across the volume enclosed by the envelope. For the example of mapping the local requirement value of the stress across the three-dimensional article, the densities of the density field may be proportional to the stress.

Using the density field, the adaptive Voronoi tessellation can be generated as a starting point for the generation of the skeleton graphs of the digital minimal surface model, allowing to relate the spatial mapping of local requirement values of the at least one physical parameter to the digital minimal surface model and accordingly, to the additively manufactured minimal surface structure. Therefore, the parametrization of requirements by local requirement values of the at least one physical parameter can be translated into a parametrization of the digital minimal surface model by using the density field and the adaptive Voronoi tessellation adapted to the density field. In doing so, an additively manufactured minimal surface structure can be obtained, which is by design structurally adapted to physical requirements across the three-dimensional article and specific boundary conditions, respectively, owing to the generation of the digital minimal surface model using the density field.

For example, a density field with densities proportional to stress requirements across the three-dimensional article may translate to skeleton graphs being denser at respective positions of the three-dimensional article with increased stress values which in turn results in a minimal surface structure which is structurally denser in said positions in order to be able to withstand the higher stress values prevailing at said positions.

Hence, a so-called Adaptive Density Minimal Surface (ADMS) structure can be obtained by non-limiting embodiments or aspects of the present disclosure, which may be inherently locally adapted to input requirement parameters. Non-limiting embodiments or aspects of the present disclosure may provide an advantage that said local adaptation to input requirement parameters can be included in a bottom-up fashion while parametrizing the digital minimal surface model itself according to which the minimal surface structure is to be additively manufactured.

The three-dimensional article may comprise a shell, with the minimal surface structure forming an infill structure within the shell of the three-dimensional article. The shell may coincide with the article envelope.

Alternatively, the minimal surface structure may form the three-dimensional article or part of the three-dimensional article without a shell.

In some non-limiting embodiments or aspects of the present disclosure, generating the adaptive Voronoi tessellation comprises: generating a set of scatter points corresponding to a distribution of the densities of the density field; randomly distributing the scatter points across the volume enclosed by the envelope; generating a plurality of Voronoi cells of the adaptive Voronoi tessellation using the randomly distributed scatter points as generating points of the Voronoi cells.

By generating the set of scatter points, the number of Voronoi cells of the adaptive Voronoi tessellation can be adapted to the distribution of densities in order to obtain a minimal surface structure with structural details which correspond to the contrast in the densities of the density field. For the physical parameter of stresses across the three-dimensional article for example, the distribution of stresses can be recorded in a histogram stored in the computer, where the number of scatter points is proportional to the ratio of the sum of all stresses in the bins of the histogram to the product of the largest stress and the number of bins. However, other physical parameter values can accordingly be recorded in a histogram which may be used to calculate the number of scatter points.

In some non-limiting embodiments or aspects of the present disclosure, the randomly distributed scatter points are redistributed according to the density field, such that the redistributed distribution of scatter points corresponds to the density field. The redistributed scatter points may be used as initial generating points for generating the Voronoi cells of the adaptive Voronoi tessellation.

In some non-limiting embodiments or aspects of the present disclosure, generating the adaptive Voronoi tessellation using the density field comprises iteratively generating a plurality of Voronoi cells of the Voronoi tessellation by weighted stippling using the density field.

By weighted stippling using the density field, a set of generating points for the plurality of Voronoi cells can be generated, where the position of the generating points is determined by the density values of the density field. In particular, weighted stippling using the density field typically causes regions with higher density values to contain more generating points than regions with lower density values, such that the density field may weight the packing of Voronoi cells of the adaptive Voronoi tessellation. Weighting the packing of Voronoi cells by the density field therefore provides an advantage that the characteristics of the density field can be transferred to structural characteristics of the minimal surface structure originating from the adaptive Voronoi tessellation. Furthermore, iteratively generating the Voronoi cells by weighted stippling allows to start with an initial, for example random, distribution of generating points of a plurality of Voronoi cells and to iteratively adapt the positioning of the generating points or the packing of the Voronoi cells, respectively, to the density field by repeating the weighted stippling.

In some non-limiting embodiments or aspects of the present disclosure, the iterative generation of Voronoi cells by weighted stippling starts with the randomly distributed scatter points or redistributed scatter points as described above. The randomly distributed or redistributed scatter points may therefore serve as initial generating points of the Voronoi cells of the adaptive Voronoi tessellation.

In some non-limiting embodiments or aspects of the present disclosure, iteratively generating the plurality of Voronoi cells comprises iterating the steps of: a) calculating the weighted centroid of each Voronoi cell using the density field and shifting generating points of the Voronoi cells to the respective centroids; b) generating new Voronoi cells of the adaptive Voronoi tessellation using the shifted generating points and replacing the Voronoi cells of step a) by the new Voronoi cells; until the calculated centroids conform with the generating points of the Voronoi cells in step a).

By iterating the steps of a) and b) for iteratively generating the plurality of Voronoi cells, a three-dimensional centroidal Voronoi tessellation weighted according to the density field can be achieved as adaptive Voronoi tessellation. The iteration of steps a) and b) preferably ends when the calculated centroids coincide with the generating points of the Voronoi cells in step a). In some non-limiting embodiments or aspects of the present disclosure, however, a tolerance is allowed such that the iteration of steps a) and b) ends when the distance between the calculated centroids and the generating points of the Voronoi cells in step a) is smaller than a predetermined tolerance value. For example, the tolerance value may be $10^{-3}$ times the minimum wall width of the minimal surface structure.

In some non-limiting embodiments or aspects of the present disclosure, iteratively generating the plurality of Voronoi cells comprises executing the steps of: c) calculating for each Voronoi cell a cell weight by integrating the density field over the respective Voronoi cell; d) recording, in the computer, a first weight threshold and a second weight threshold, wherein the first weight threshold is larger than the second weight threshold; e) splitting Voronoi cells with a cell weight above the first weight threshold and deleting Voronoi cells with a cell weight below the second weight threshold; after step b) described above.

By executing the steps c)-e), the adaptive Voronoi tessellation can further be adapted to the density field. Furthermore, convergence of the adaptive Voronoi tessellation to a centroidal Voronoi tessellation can be improved. Steps c)-e) advantageously allow to adapt the sizes of the Voronoi cells according to the density field by creating smaller Voronoi cells by splitting and larger Voronoi cells by deleting or merging neighboring Voronoi cells, respectively.

Splitting of a Voronoi cell may be achieved by randomly generating two generating points within the Voronoi cell and generating two new Voronoi cells from the two generating points. Usually, Voronoi cells with a cell weight between the first and second weight threshold may be left unmodified.

In some non-limiting embodiments or aspects of the present disclosure, the first weight threshold is defined as the ratio of the integral of the density field over the volume enclosed by the envelope to the number of centroids multiplied by a factor (1+a), and the second weight threshold is defined as the ratio of the integral of the density field over the volume enclosed by the envelope to the number of centroids multiplied by a factor (1−a), wherein preferably a being between 0.3 and 0.7, further preferably a=0.5.

The steps c)-e) may be executed until the cell weights of the Voronoi cells lie between the first and second weight threshold and no splitting and/or merging of Voronoi cells is required anymore.

In some non-limiting embodiments or aspects of the present disclosure, steps c)-e) are executed for the first 5-30%, preferably 10%, of the iterations of steps a)-b).

Executing steps c)-e) after step b) provides an advantage that the convergence to a centroidal Voronoi tessellation can be improved.

In some non-limiting embodiments or aspects of the present disclosure, generating the density field comprises: dividing the volume enclosed by the envelope into a plurality of, preferably tetrahedral, primary voxels and generating at least one local requirement value for each primary voxel.

Preferably, the primary voxels are each assigned a local requirement value for a certain physical parameter. For example, each primary voxel may be assigned a certain stress value. In a further example, each primary voxel may be assigned a certain stress value and a certain strain value.

The local requirement values for the primary voxels are preferably generated by a FEM simulation. The local requirement values of the primary voxels as generated by the FEM simulation may be output to a histogram stored in the computer.

In some non-limiting embodiments or aspects of the present disclosure, the following pre-processing steps are executed by the computer prior to the generating of the adaptive Voronoi tessellation: dividing the volume enclosed by the envelope into a plurality of, preferably tetrahedral, primary voxels; generating a cuboid envelope BBB encompassing the envelope; calculating the volume env_vol enclosed by the envelope as the sum of the volumes of all primary voxels in the envelope and the volume bbb_vol enclosed by the cuboid envelope as the sum of the volumes of all voxels in the cuboid envelope; calculating a maximal grid size max_grid as 0.5 times the sum of a maximum channel diameter max_channel which represents the diameter of a largest channel of the minimal surface structure and a minimum wall width min_wall which represents the smallest wall width of the minimal surface structure; calculating a number of points pts_bbb in the cuboid volume at the maximal grid size as: pts_bbb=(BBB_width/max_grid)×(BBB_depth/max_grid)×(BBB_height/max_grid), where BBB_width, BBB_depth, BBB_height denote the width, depth and height of the cuboid envelope BBB; calculating a number of points pts_env in the envelope at the maximal grid size as: pts_env=pts_bbb×(env_vol/bbb_vol).

In some non-limiting embodiments or aspects of the present disclosure, the number of scatter points pts_use is calculated as: pts_use=pts_env×prop_hist, where prop_hist is the ratio of the sum of all values of a certain physical parameter in bins of a histogram in which the values of the physical parameter are recorded to the product of the largest value of the physical parameter and the number of bins.

In some non-limiting embodiments or aspects of the present disclosure, the primary voxels generated by the pre-processing steps as described above, are replaced by a plurality of secondary, preferably cubic, voxels. Typically, the number of secondary voxels is, preferably by one or more orders of magnitudes, larger than the number of primary voxels. The secondary voxels are preferably generated by interpolating the density field values of the primary voxels.

In some non-limiting embodiments or aspects of the present disclosure, the number of secondary voxels is increased if after the iterations a)-b), optionally including steps c)-e), a Voronoi cell contains less than 10 secondary voxels, and the generation of the adaptive Voronoi tessellation and the iterations a)-b), optionally including steps c)-e), is restarted.

In some non-limiting embodiments or aspects of the present disclosure, the first skeleton graph is formed by edges of Voronoi cells of the adaptive Voronoi tessellation.

In some non-limiting embodiments or aspects of the present disclosure, the second skeleton graph is generated by Delaunay tetrahedralization of generating points of the adaptive Voronoi tessellation.

Preferably, the first and second skeleton graphs are generated after the adaptive Voronoi tessellation has converged to a centroidal Voronoi tessellation in accordance with the density field, as described above.

For example, two intertwining skeleton graphs can be achieved in order to generate a minimal surface structure without self-intersections.

Although generated using Delaunay tetrahedralization, the second skeleton graph may comprise one or more corrected segments which do not coincide with the edges of Delaunay the tetrahedralization, in order to adapt to topological conditions. For example, such a topological condition may use segments of the second skeleton graph connecting generating points of neighboring Voronoi cells to only run within said neighboring Voronoi cells. In case such a segment is to run through a third Voronoi cell, an additional point may be inserted at a plane where the neighboring Voronoi cells adjoin, such that the segment may take a detour through said point avoiding crossing of the third Voronoi cell. Such corrected segments may alternatively or additionally be applied to the first skeleton graph.

In some non-limiting embodiments or aspects of the present disclosure, from a segment of the first and/or second skeleton graph which traverses the envelope of the three-dimensional article, a first segment part lying outside the volume enclosed by the envelope is removed and replaced by a segment part which is obtained by mirror-imaging about the envelope at the position where the segment of the first and/or second skeleton graph traverses the envelope a second segment part lying inside the volume and adjoining the first segment part.

In doing so, essentially perpendicular adjoining of the minimal surface structure on the envelope of the three-dimensional article can be achieved. This is particularly advantageous for a three-dimensional article with a shell where the minimal surface structure forms an infill structure, such that the minimal surface structure may meet the shell essentially perpendicularly at places where loads work on the shell.

In some non-limiting embodiments or aspects of the present disclosure, endings of the first and/or second skeleton graph are modified to avoid the minimal surface structure to generate overhangs which may not be 3D printed without the use of build supports. This may be achieved by modifying the endings of the first and/or second skeleton graph such that the segments at said endings are inclined towards the center of the three-dimensional article. This is particularly advantageous for three-dimensional articles without a shell where the minimal surface structure is designed to be 3D printed without the use of build supports.

Zero mean curvature as a feature of minimal surfaces may not be fulfilled anymore for the minimal surface structure modified at the boundary of the three-dimensional article as described herein. However, zero mean curvature may still be fulfilled for a substantial part of the minimal surface structure and in the context of non-limiting embodiments or aspects of the present disclosure, such a minimal surface structure shall still be considered as being based on a minimal surface.

In some non-limiting embodiments or aspects of the present disclosure, Voronoi cells which extend beyond the envelope of the three-dimensional article are trimmed at the envelope and the centroids of the trimmed Voronoi cells are recalculated using the density field.

Alternatively, Voronoi cells which extend beyond the envelope may not be trimmed regardless of their extensions beyond the envelope.

The labyrinths or channels, respectively, may be closed by closures on peripheral openings of the channels. In some non-limiting embodiments or aspects of the present disclosure, the channels are closed by placing closures on the peripheral openings and applying smoothening by a conformalized mean curvature flow algorithm. By doing so, internal space smoothness of the channels can advantageously be maximized. In some non-limiting embodiments or aspects of the present disclosure, the channels are closed by placing closures on the peripheral openings and applying smoothening by a conformalized mean curvature flow algorithm while retaining the center of the closure. By doing so, the internal volume of the channels can advantageously be maximized. In some non-limiting embodiments or aspects of the present disclosure, a V-shaped or rounded V-shaped closure is used to close the peripheral openings of the channels. This may be achieved by increasing the wall width to more than half of the local channel diameter at the peripheral opening of the channel. Rounding may be achieved by a conformalized mean curvature flow algorithm. In some non-limiting embodiments or aspects of the present disclosure, the minimal surface structure is joined with the envelope or shell, respectively, at the positions where the minimal surface structure impinges on the envelope or shell, respectively, without applying a separate closure or modifying the shape of the minimal surface structure, such that the envelope or shell, respectively, closes the respective channels. Different closure schemes may be used for different peripheral openings of the channels. Optionally, the original minimal surface structure (without closures) may additionally be upheld up to the envelope for all closure schemes, in order to enable ideal force transmission and ensure integrability of the minimal surface structure in a higher-level assembly.

Typically, the two labyrinths may be disjoint and do not exhibit interconnections. In some non-limiting embodiments or aspects of the present disclosure, however, the wall of the minimal surface structure may exhibit one or more perforations which allow the two labyrinths to be interconnected. The one or more perforations may be achieved by generating additional linking labyrinths between the two labyrinths.

In some non-limiting embodiments or aspects of the present disclosure, the two labyrinths may be interconnected through a contact space at the envelope.

In some non-limiting embodiments or aspects of the present disclosure, the three-dimensional article may comprise one or more external piping elements arranged beyond the envelope which interconnect one or more peripheral openings of different channels or of the same channel.

In some non-limiting embodiments or aspects of the present disclosure, all except peripheral openings two peripheral openings of each channel are closed, such that the non-closed openings may each form a fluid inlet and outlet of a respective channel. In doing so, two separate media may be allowed to flow, especially counterflow, through the minimal surface structure. This may be particularly advantageous for a heat exchanger or heat equalizer structure.

In some non-limiting embodiments or aspects of the present disclosure, the two channels or labyrinths, respectively, are connected by interconnecting one or more peripheral openings of different channels, wherein two peripheral openings are left open and the remaining peripheral openings are closed. The two peripheral openings which are left open are preferably arranged at opposite sides of the three-dimensional article. The two peripheral openings which are left open may serve as an inlet and outlet. Such an embodiment may be used for a crash-resistant fuel tank, for example in a helicopter, or a zero-g capable fuel tank, for example in a spacecraft. The inlet may be used to fill the tank with fuel, wherein while operating the tank, gas may be filled through the inlet to force the fuel to the outlet to exit the tank.

In some non-limiting embodiments or aspects of the present disclosure, the two labyrinths are used as storage compartments of a tank to store two components of a fuel, such as for example hydrogen and oxygen, which may be mixed upon exiting the tank. Such an embodiment may be used for example in a rocket. In some non-limiting embodiments or aspects of the present disclosure, the minimal surface structure may comprise additional labyrinths embedded inside the wall of the minimal surface structure. For example, a single additional labyrinth may be embedded inside the wall of the minimal surface structure, such that a three-chamber system may be formed. This may be particularly advantageous for heat exchanger structures with an internal coolant loop in order to speed up initial heating and/or cooling. In a further example, two additional labyrinths may be embedded inside the wall of the minimal surface structure, such that a four-chamber system may be formed. This may be particularly advantageous for heat exchanger structures with two counter-circulating internal coolant loops to speed up initial heating and/or cooling.

In some non-limiting embodiments or aspects of the present disclosure with a three or four-chamber system as described above, the two chambers created by the original labyrinths are larger than the one or two chambers which are embedded inside the wall of the minimal surface structure. For cryogenic fuels the larger chambers may comprise one fuel component or two fuel components, and the smaller chambers may comprise a coolant loop. Such an embodiment of a three or four-chamber system may serve as a fuel tank of a rocket, which may be used as a load-bearing structure of the rocket. The load-bearing structure may be enclosed with an ultralightweight envelope or skin which may serve to reduce aerodynamic resistance during a rocket's ascent through the atmosphere.

In some non-limiting embodiments or aspects of the present disclosure, generating the digital minimal surface model from the first and second skeleton graphs comprises: generating a minimal surface precursor from the first and second skeleton graphs; generating a minimal surface shape by smoothening the minimal surface precursor; assigning a wall width to the minimal surface shape; generating the digital minimal surface model according to the minimal surface shape and the assigned wall width.

Preferably, the minimal surface precursor is generated as a surface being equidistant to the first and second skeleton graphs. In some non-limiting embodiments or aspects of the present disclosure, the minimal surface precursor is generated as a surface with a first distance d to the first skeleton graph and a second distance s to the second skeleton graph. In some non-limiting embodiments or aspects of the present disclosure, the first distance d and/or the second distance s vary along the first and/or second skeleton graph.

The wall width may be a global wall width with a global wall width value assigned to the minimal surface shape. Alternatively, the wall width may be a varying wall width which varies while being assigned along the minimal surface shape and accordingly, varies along the minimal surface structure generated according to the digital minimal surface model. Therefore, different local wall width values may be assigned to the minimal surface shape at different positions of the minimal surface shape. By generating the digital minimal surface model according to the minimal surface shape and the assigned wall width, the digital minimal surface model can acquire the geometry as defined by the minimal surface shape, and a wall with the assigned wall width such that the minimal surface structure can be 3D printed according to the digital minimal surface model.

A local wall width value may be inferred from a wall width density field. Alternatively, a local wall width value may be inferred from the density field in combination with a set of rules specifying the wall width at different positions of the minimal surface structure or the three-dimensional article, respectively, wherein the set of rules are defined by requirements of the minimal surface structure or the three-dimensional article, respectively.

For example, a local maximum wall width may be related to a minimum channel diameter of the minimal surface structure and be defined as an upper bound of local wall widths in the set of rules, in order to prevent the walls from closing a channel in the minimal surface structure. In a further example, a rule for the local wall width may be defined by relating the local wall width to a channel diameter in order to close one or more channels of the minimal surface structure. In a further example, a rule for the local wall width may be defined by the requirement of the amount of printed material to be constant at every cross-section of the minimal surface structure.

In order to generate the wall of the digital minimal surface model, a pair of isosurfaces may be generated which is, in some non-limiting embodiments or aspects of the present disclosure, equally spaced from the minimal surface shape in both directions facing away from the minimal surface shape. In some non-limiting embodiments or aspects of the present disclosure, the pair of isosurfaces are not equally spaced from the minimal surface shape. In some embodiments, the distance or distances of the isosurfaces to the minimal surface shape varies according to the local wall widths assigned to the minimal surface shape, such that the generated wall of the digital minimal surface model may exhibit a finite wall width according to the assigned local wall widths. The pair of isosurfaces may be joined together at the peripheral ends of the isosurfaces by generating an end face which connects the two isosurfaces.

After generating the digital minimal surface model, parts of the digital minimal surface model lying outside the envelope may be removed by projecting said parts back to the envelope, wherein overlapping, self-intersecting and/or zero area surface parts and/or coincident points are removed. Small surface parts with an area below a threshold area may be merged.

In some non-limiting embodiments or aspects of the present disclosure, generating the digital minimal surface model from the first and second skeleton graphs comprises: assigning a first electrical charge to the first skeleton graph; assigning a second electrical charge to the second skeleton graph, the second electrical charge being equal in absolute value, but opposite in sign to the first electrical charge; generating the minimal surface precursor as an equipotential surface between the first and second skeleton graph using a Coulomb force field calculated based on the first and second skeleton graphs and their electrical charges.

In doing so, a minimal surface precursor can be achieved which is equidistant to the first and second skeleton graphs. Generating the minimal surface precursor as an equipotential surface between the first and second skeleton graphs using a Coulomb force field provides the advantage of an efficient and processing power-saving scheme to generate a minimal surface precursor being equidistant to the first and second skeleton graphs and separating the two labyrinths defined by the skeleton graphs.

A minimal surface shape may be generated by smoothening for example by using a conformalized mean curvature flow algorithm, as described e.g. in K. Crane, U. Pinkall, P. Schröder, ACM Transactions on Graphics, July 2013, Article No.: 61, "Robust fairing via conformal curvature flow", the entire contents of which is incorporated herein by reference. The resulting minimal surface shape may be analyzed for the condition of zero mean curvature and the conformalized mean curvature flow algorithm may be reapplied in order to optimize the minimal surface shape with respect to the zero mean curvature condition. Alternatively, the minimal surface shape may be generated from the minimal surface precursor by e.g. minimizing the squared mean curvature of the minimal surface precursor, smoothening using a Laplace operator and/or LS3 Loop subdivision. Further smoothening schemes are described in the application PCT/IB2019/

054076 of the present applicant, the description of which is hereby incorporated by reference in its entirety.

Preferably, the at least one physical parameter is selected from at least one of: mechanical load, stress values and/or distribution, maximal allowable stress, strain, local deformation allowance, stiffness, flexibility, vibration, attenuation across specified frequency range, amount of storable fluid, fluid flow, heat transport, heat transport along the minimal surface structure (e.g., within the walls), heat transport across the minimal surface structure (e.g., from the labyrinth of the first skeleton graph to the labyrinth of the second skeleton graph), mass budget, mass distribution, momentum distribution, article geometry such as for example increased material density along the perimeter of the article, minimum and/or maximum channel diameter of the minimal surface structure, minimum and/or maximum wall width of the minimal surface structure, enforced cross-sectional area of the channels of the minimal surface structure or of the wall of the minimal surface structure at a given cross-sectional location (e.g., globally equalized across the three-dimensional article or locally specified), 3D printability such as for example increased density adjacent to overhangs or under horizontal outer shells, location of the center of mass of the three-dimensional article, geometry optimization towards bone regrowth for implant applications, material resorption, permeability, volume proportion between the labyrinths (e.g., which may be varied by asymmetric wall widths or asymmetric alignment of the minimal surface precursor with respect to the skeleton graphs), minimum and/or maximum voids of the labyrinths.

According to some non-limiting embodiments or aspects of the present disclosure, provided is aa minimal surface structure additively manufactured by a method according to non-limiting embodiments or aspects of the present disclosure.

In an embodiment or aspect of the minimal surface structure, the minimal surface structure is a quasiperiodic structure.

In an embodiment or aspect of the minimal surface structure, the minimal surface structure is an amorphous structure.

According to some non-limiting embodiments or aspects of the present disclosure, provided is a non-transitory computer-readable medium having stored thereon computer-executable instructions adapted to cause 3D printer to additively manufacture a minimal surface structure according to a digital minimal surface model as described herein, the computer-executable instructions comprising a processor executing the steps of: recording in the computer an envelope of the three-dimensional article; generating a density field across a volume enclosed by the envelope with densities of the density field corresponding to local requirement values of at least one physical parameter at respective positions of the three-dimensional article; generating an adaptive Voronoi tessellation of the volume using the density field; generating a first skeleton graph associated with the adaptive Voronoi tessellation; generating a second skeleton graph associated with the first skeleton graph; generating the digital minimal surface model from the first and second skeleton graphs.

According to some non-limiting embodiments or aspects of the present disclosure, provided is a computer-implemented method of generating a digital minimal surface model adapted for additively manufacturing a minimal surface structure according to the digital minimal surface model by a 3D printer as described herein, the computer-implemented method comprising a processor executing the steps of: recording in the computer an envelope of the three-dimensional article; generating a density field across a volume enclosed by the envelope with densities of the density field corresponding to local requirement values of at least one physical parameter at respective positions of the three-dimensional article; generating an adaptive Voronoi tessellation of the volume using the density field; generating a first skeleton graph associated with the adaptive Voronoi tessellation; generating a second skeleton graph associated with the first skeleton graph; generating the digital minimal surface model from the first and second skeleton graphs; storing the digital minimal surface model on a computer-readable medium.

The computer-readable medium may be a non-transitory computer-readable medium and/or a data signal embodied as a carrier wave.

According to some non-limiting embodiments or aspects of the present disclosure, provided is a computer program product comprising computer program code configured to control a computer such that the computer executes the steps of the computer-implemented method according to non-limiting embodiments or aspects of the present disclosure.

BRIEF DESCRIPTION OF THE DRAWINGS

Non-limiting embodiments or aspects of the present disclosure will be explained in more detail, by way of exemplary embodiments, with reference to the schematic drawings, in which.

DESCRIPTION

Figure 1:
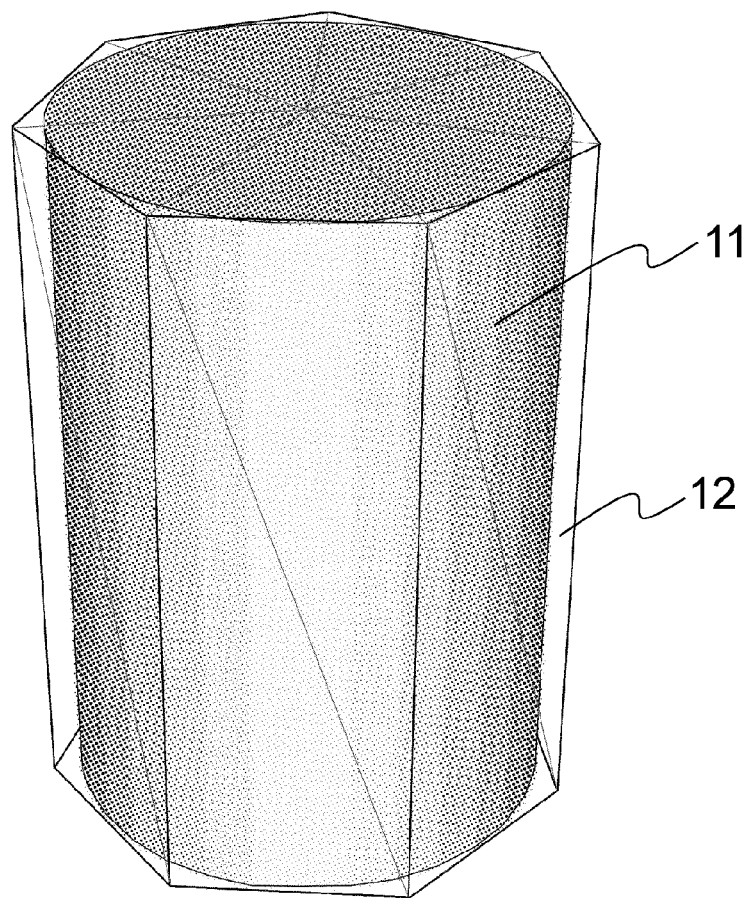
FIG. 1 shows a perspective view of an article envelope and a density field envelope.

FIG. 1 shows a perspective view of an article envelope 11 of a three-dimensional article to be additively manufactured and a density field envelope 12 enclosing the article envelope 11. The article envelope 11 has a cylindrical shape and represents the boundary of the cylindrical three-dimensional article. The density field envelope 12 is a 7-polygonal prism providing a simplification of the article envelope 11 in order to reduce processing power of the computer generating the digital minimal surface model.

Figure 2:
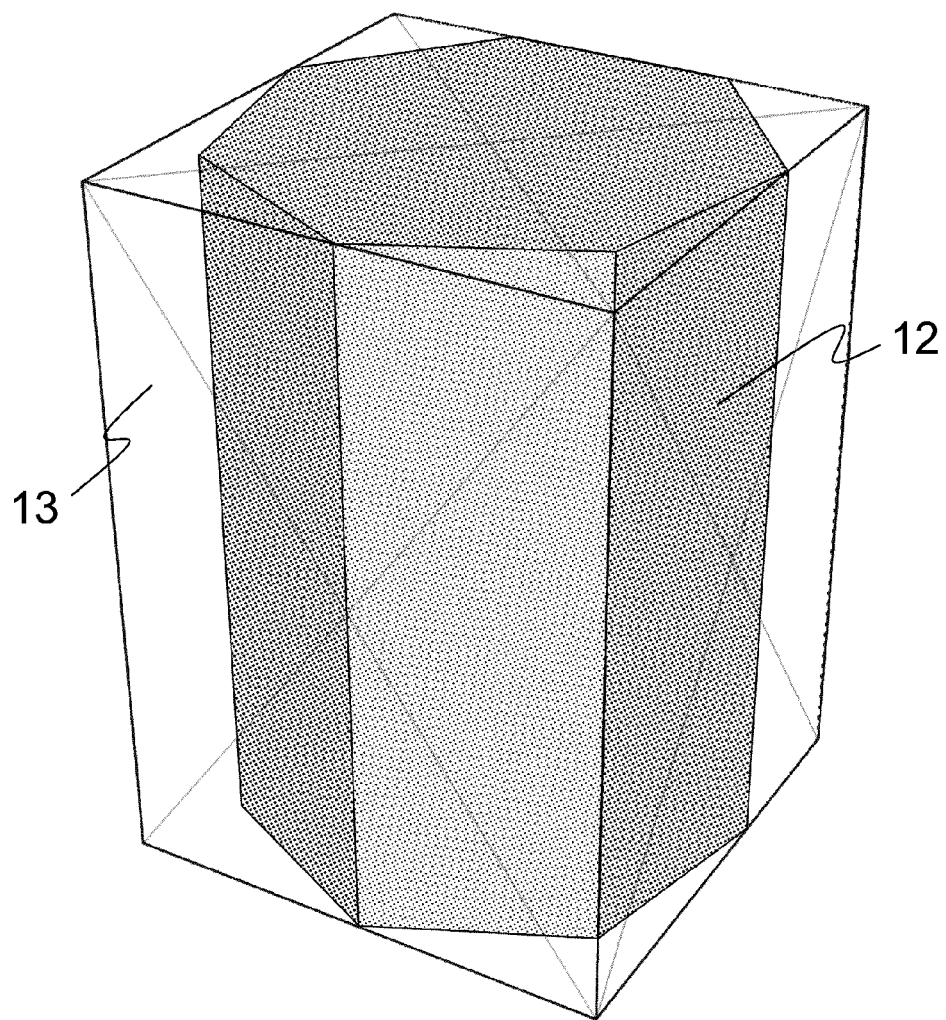
FIG. 2 shows a perspective view of the density field envelope of FIG. 1 and a cuboid envelope.

FIG. 2 shows a perspective view of the density field envelope 12 of FIG. 1 and a cuboid envelope 13 (BBB) enclosing the density field envelope 12. Using the cuboid envelope 13 and a subdivision into voxels of the volumes enclosed by the density field envelope 12 and the cuboid envelope 13, a number of points pts_bbb in the cuboid volume at bbb_vol at the maximal grid size max_grid can be calculated as pts_bbb=(BBB_width/max_grid)×(BBB_depth/max_grid)×(BBB_height/max_grid), where BBB_width, BBB_depth, BBB_height denote the width, depth and height of the cuboid envelope BBB. The maximal grid size max_grid is calculated as 0.5 times the sum of a maximum channel diameter max_channel which represents the diameter of a largest channel of the minimal surface structure and a minimum wall width min_wall which represents the smallest wall width of the minimal surface structure to be 3D printed. From this, a number of points pts_env in the density field envelope at the maximal grid size can be calculated as: pts_env=pts_bbb×(env_vol/bbb_vol).

Figure 3:
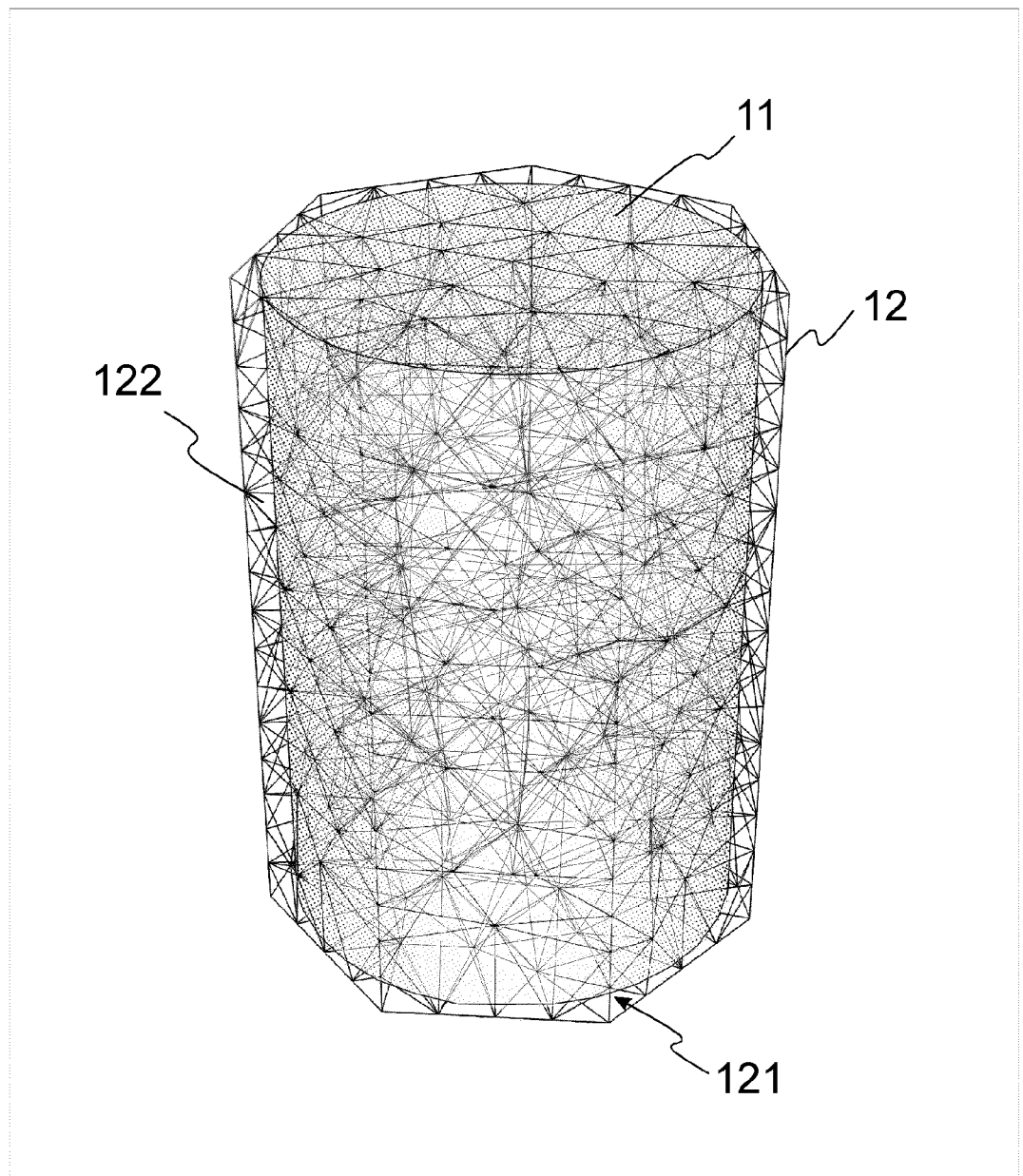
FIG. 3 shows a perspective view of the density field envelope with an enclosed volume subdivided by a tetrahedral voxel field and the article envelope.

FIG. 3 shows a perspective view of the density field envelope 12 with an enclosed volume 121 subdivided by a tetrahedral voxel field with tetrahedral primary voxels 122. The article envelope 11 of FIG. 1 is shown in addition. A FEM (Finite Element Method) simulation is performed by a computer in order to generate local requirement values of a physical parameter, such as strain, of the three-dimensional article for each of the primary voxels 122.

Figure 4:
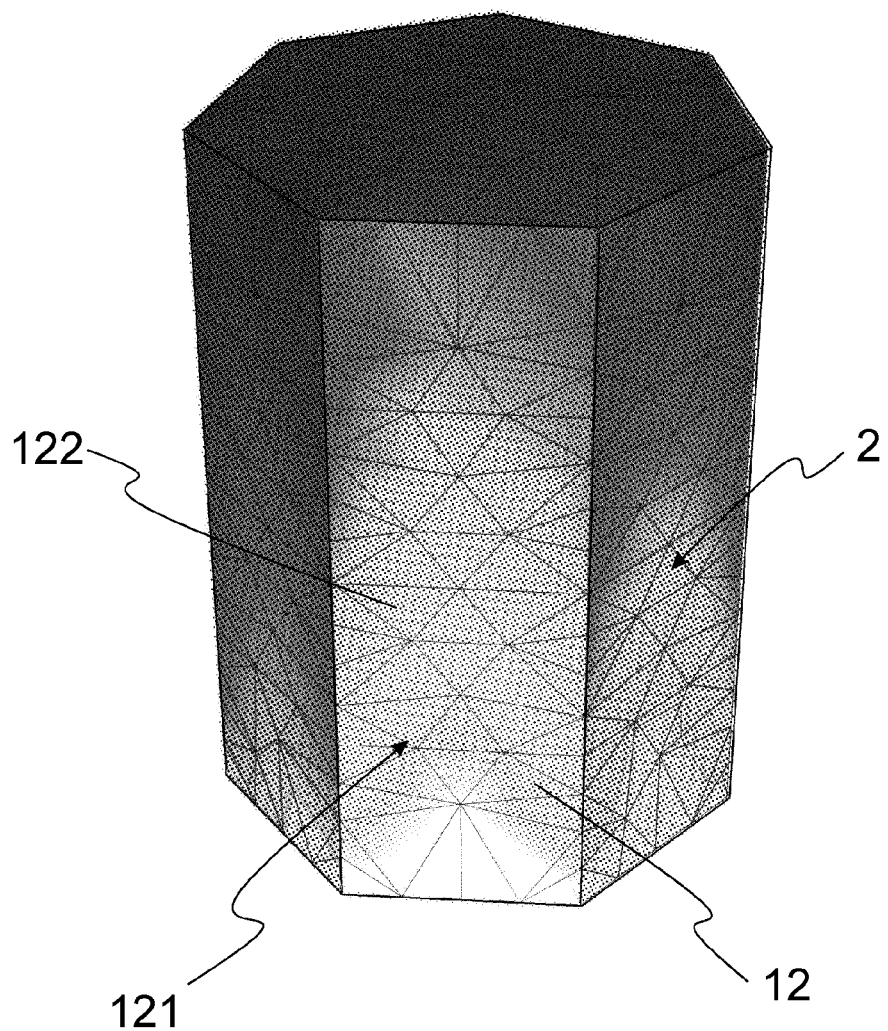
FIG. 4 shows a perspective view of the density field envelope of FIG. 3 with a calculated density field within the density field envelope.

FIG. 4 shows a density field 2 generated from the local requirement values in the volume 121 enclosed by the density field envelope 12. In the present example of strain, the densities of the density field 2 are proportional of the local strain values in the primary voxels 122. The density field 2 therefore represents a spatial mapping of the local strain within the density field envelope 12. Accordingly, the densities vary across the volume 121. For example, the densities in the lower central region of the volume 121 in FIG. 4 (white regions/voxels) are higher than towards the top of the volume 121 in FIG. 4 (black regions/voxels), indicating that the stress decreases from the bottom towards the top of the volume 121. It can also be recognized from FIG. 4 that the density is higher towards the front side of the volume 121, as indicated by the brighter voxels on the front face of the heptagonal prism of volume 121 compared to the voxels in the two neighboring faces to the left and the right (in the orientation as shown in FIG. 4).

Figure 5:
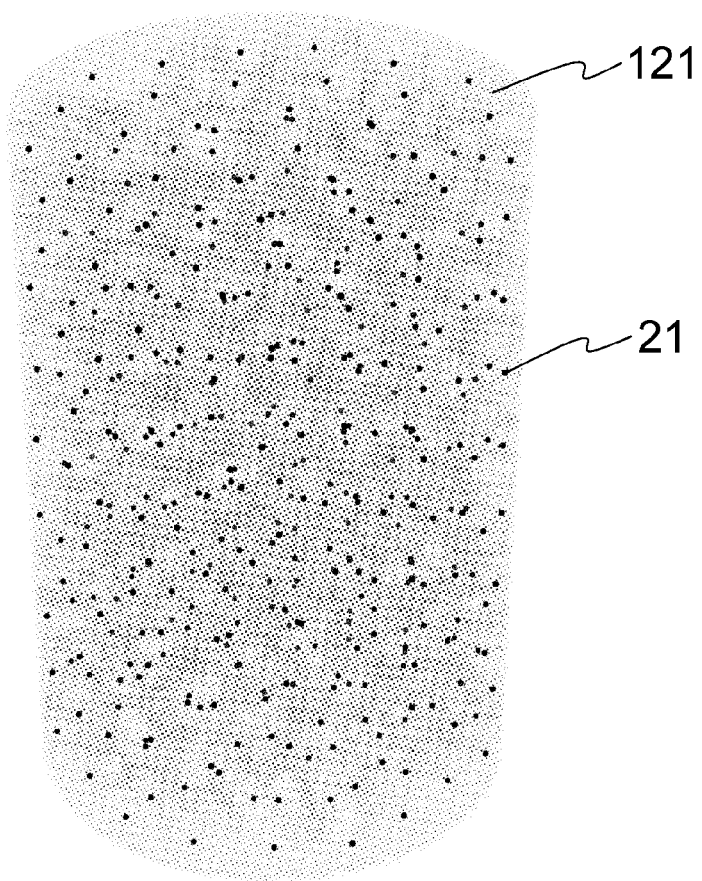
FIG. 5 shows a perspective view of a set of scatter points randomly distributed across the volume enclosed by the article envelope.

FIG. 5 shows a perspective view of a set of scatter points 21 redistributed according to the density field 2 of FIG. 4 after being randomly distributed across the volume 121 enclosed by the article envelope. The density field characteristics are further included in the calculation of the number of scatter points 21 (pts_use) as pts_use=pts_env×are_prop, where are_prop=area_histo/area_full. area_histo and area_full are obtained by a histogram into which all stress values or density values obtained by the FEM simulation are recorded. area_histo is the sum of all stresses or densities in the histogram bins and area_full is the product of the largest stress in the histogram and the number of bins in the histogram. pts_env is the number of points in the density field envelope at the maximal grid size, as described above. The scatter points 21 serve as initial generating points of the Voronoi cells of the adaptive Voronoi tessellation.

Figure 6:
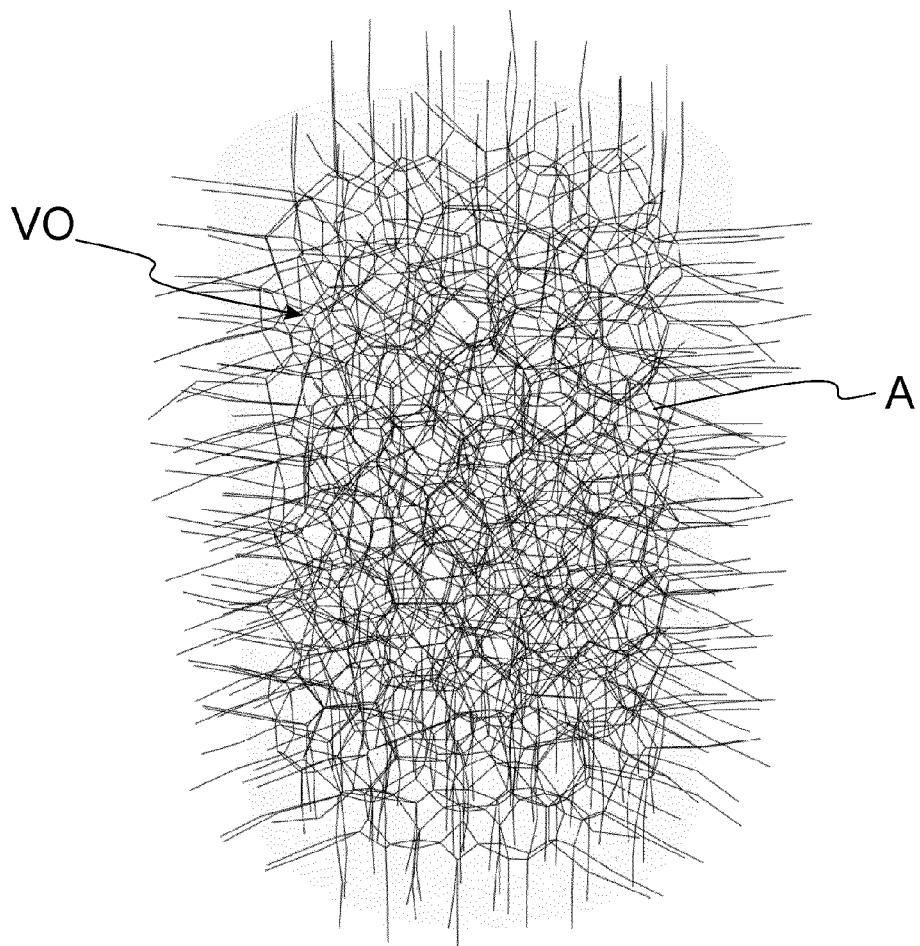
FIG. 6 shows a perspective view of an adaptive Voronoi tessellation and a first skeleton graph generated from the adaptive Voronoi tessellation of the volume enclosed by the density field envelope using the scatter points of FIG. 5.

FIG. 6 shows a perspective view of an adaptive Voronoi tessellation VO and a first skeleton graph A derived from an adaptive Voronoi tessellation VO of the volume 121 enclosed by the density field envelope, wherein the adaptive Voronoi starting from the scatter tessellation VO has been generated points 21 of FIG. 5 as initial generating points and by executing thereafter the steps of iteratively generating Voronoi cells of the adaptive Voronoi tessellation VO by weighted stippling as described above, using the density field of FIG. 3, resulting in a weighted centroidal Voronoi tessellation VO according to the density field. The skeleton graph A runs along the edges of the Voronoi cells of the adaptive Voronoi tessellation VO. For the skeleton graph A, the iteration of steps a) and b) for shifting the generating points 21 of the Voronoi cells to the centroids of the Voronoi cells using the density field, as described above, has been executed. Further, the iteration of steps c)-e), as described above, for splitting and/or merging Voronoi cells using the cell weight of the Voronoi cells has also been executed. Therefore, skeleton graph A has been generated from the weighted centroidal Voronoi tessellation VO according to the density field with adapted sizes of Voronoi cells according to the density field.

Figure 7:
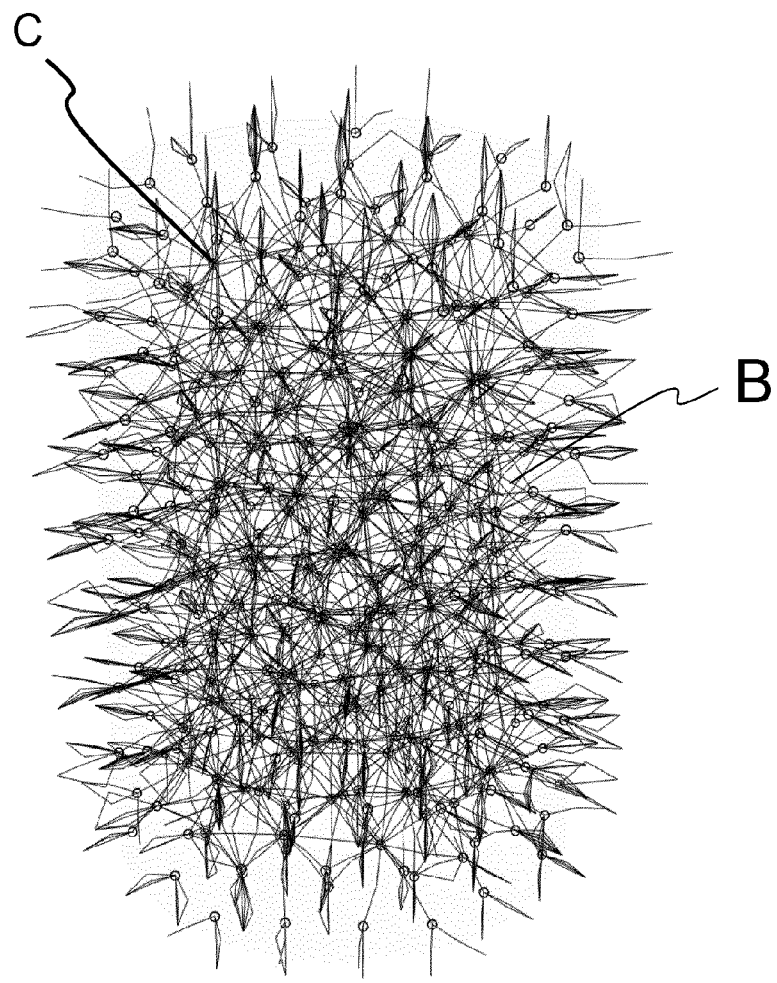
FIG. 7 shows a perspective view of a second skeleton graph generated from a Delaunay tetrahedralization of the adaptive Voronoi tessellation of FIG. 6.

FIG. 7 shows a perspective view of a second skeleton graph B generated from a Delaunay tetrahedralization of the centroidal Voronoi tessellation VO of FIG. 6. The centroids C of the Voronoi cells of FIG. 6 are also shown. The second skeleton graph B is essentially dual to the first skeleton graph A. The two skeleton graphs A and B are intertwining without intersecting each other.

Figure 8:
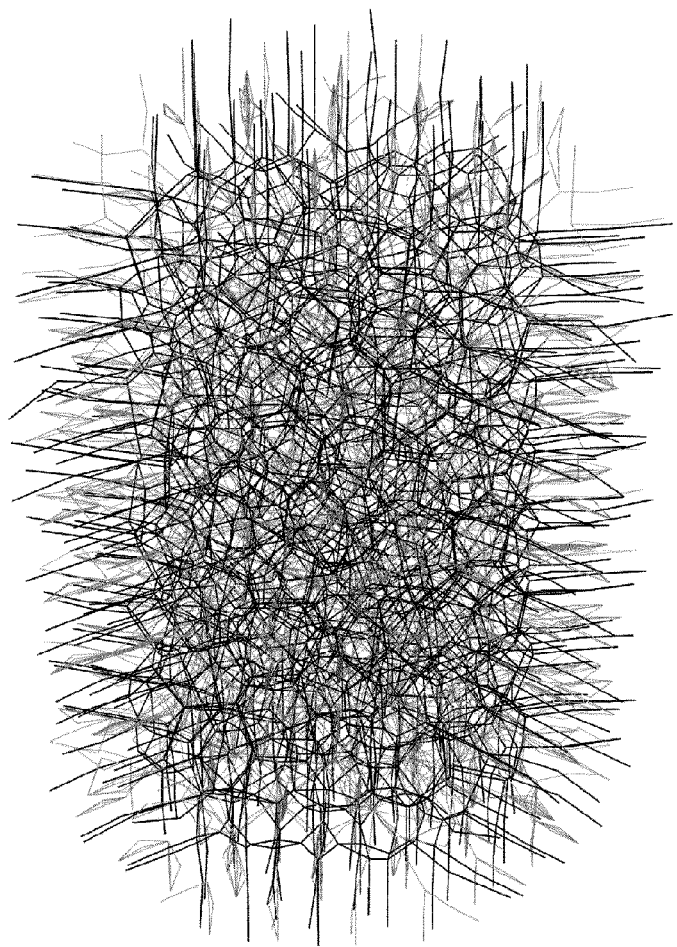
FIG. 8 shows a perspective view of the first and second skeleton graphs of FIG. 6 and FIG. 7.

FIG. 8 shows a perspective view of the intertwining first and second skeleton graphs of FIG. 6 and FIG. 7.

Figure 9:
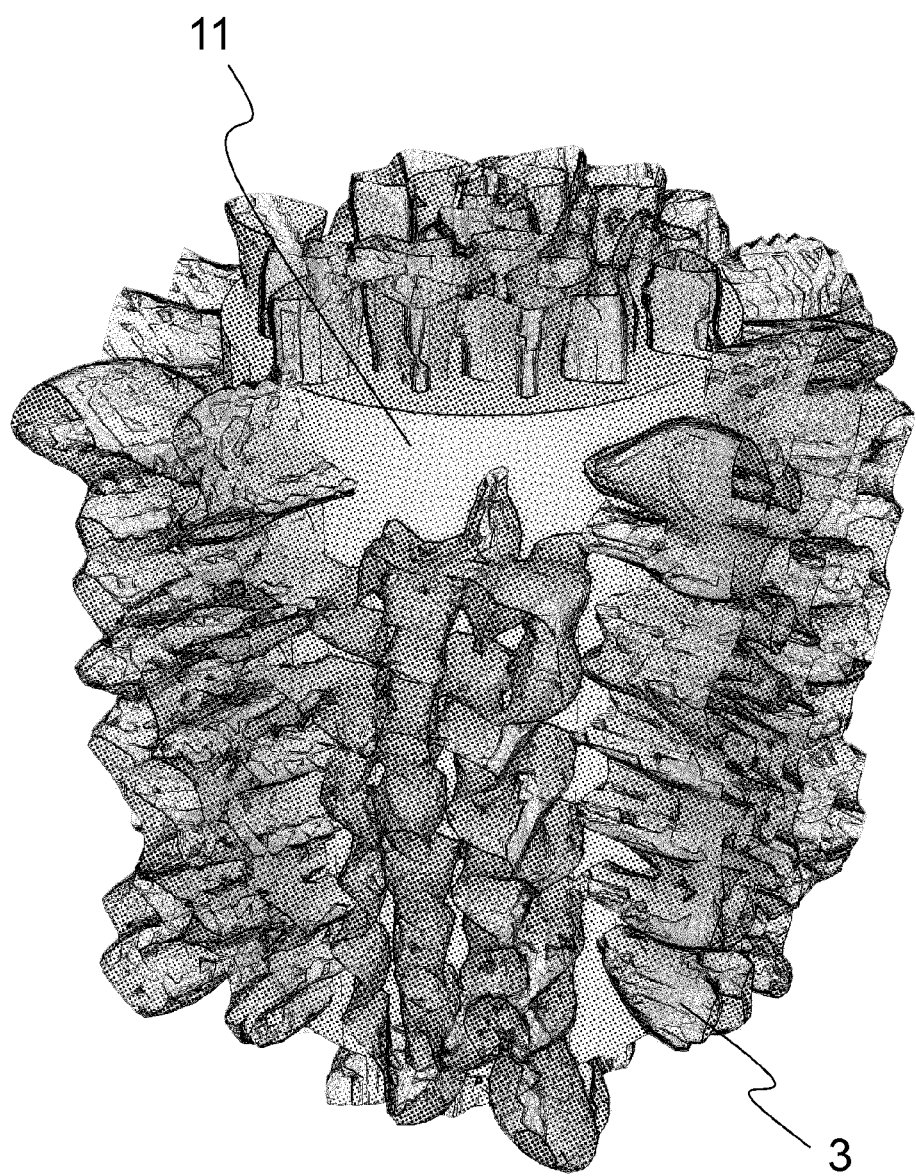
FIG. 9 shows a perspective view of a minimal surface precursor generated from the first and second skeleton graphs and protruding out of the article envelope.

FIG. 9 shows a perspective view of a minimal surface precursor 3 generated from the first and second skeleton graphs shown in FIGS. 6-8 and protruding out of the article envelope 11. The minimal surface precursor 3 is a surface being equidistant to the first and second skeleton graphs. The minimal surface precursor 3 is generated as an equipotential surface using the Coulomb force field calculated using assigned positive and negative electrical charges to the first and second skeleton graphs, as described above.

Figure 10:
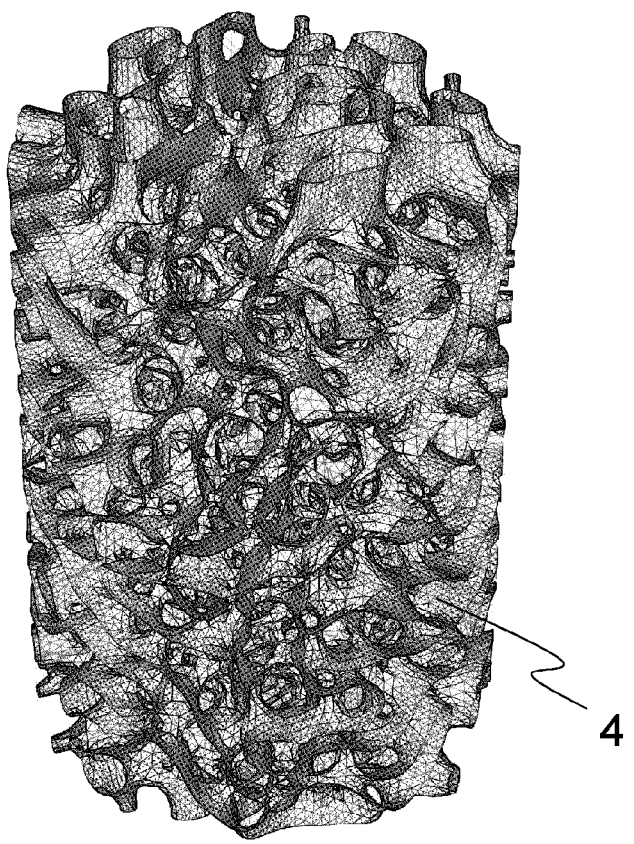
FIG. 10 shows a perspective view of a minimal surface shape obtained from a minimal surface precursor such as the one of FIG. 9 and trimmed to the article envelope.

FIG. 10 shows a perspective view of a minimal surface shape 4 obtained by smoothening from a minimal surface precursor such as the one of FIG. 9. The minimal surface shape 4 has been generated by using a conformalized mean curvature flow algorithm where the border of the minimal surface precursor is retained in order to prevent a shrinking of the minimal surface precursor while performing the conformalized mean curvature flow algorithm. The first and second skeleton graphs of FIG. 8 and accordingly, the minimal surface precursor 3 of FIG. 9 protruding out of the article envelope ensures optimal performance of the conformalized mean curvature flow algorithm also at the location of the article envelope when smoothening the minimal surface precursor 3 in order to obtain the minimal surface shape 4.

Figure 11:
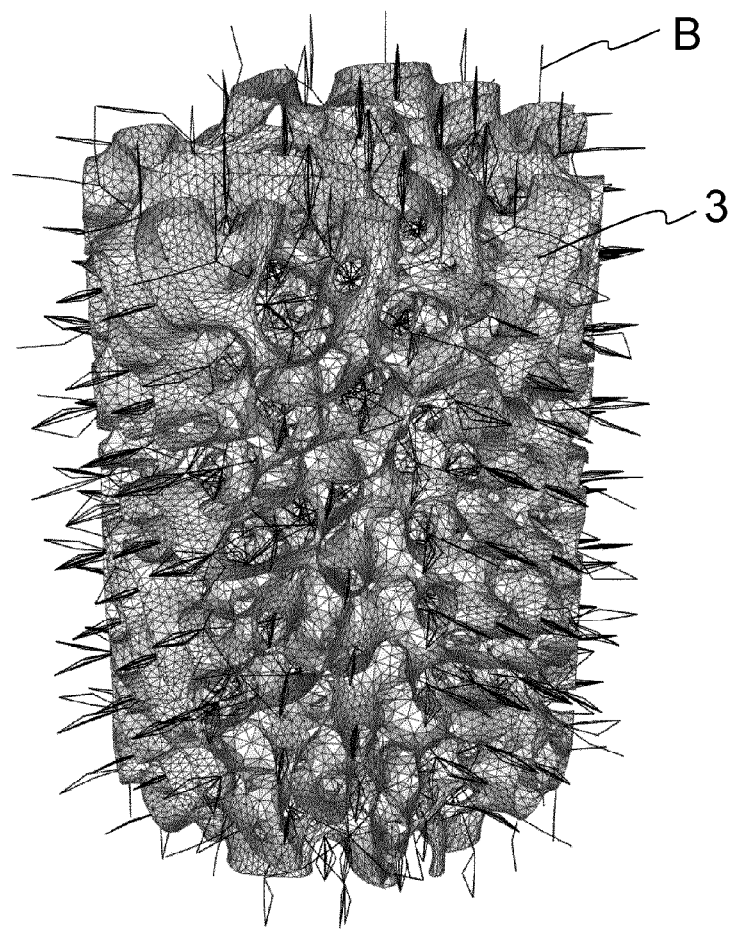
FIG. 11 shows a perspective view of a minimal surface shape such as the one of FIG. 10 together with a skeleton graph.

FIG. 11 shows a perspective view of a minimal surface shape 3 such as the one of FIG. 10. The second skeleton graph B of FIG. 7 is shown in addition for illustrative purposes. The first skeleton graph has been omitted for improved representation.

Figure 12:
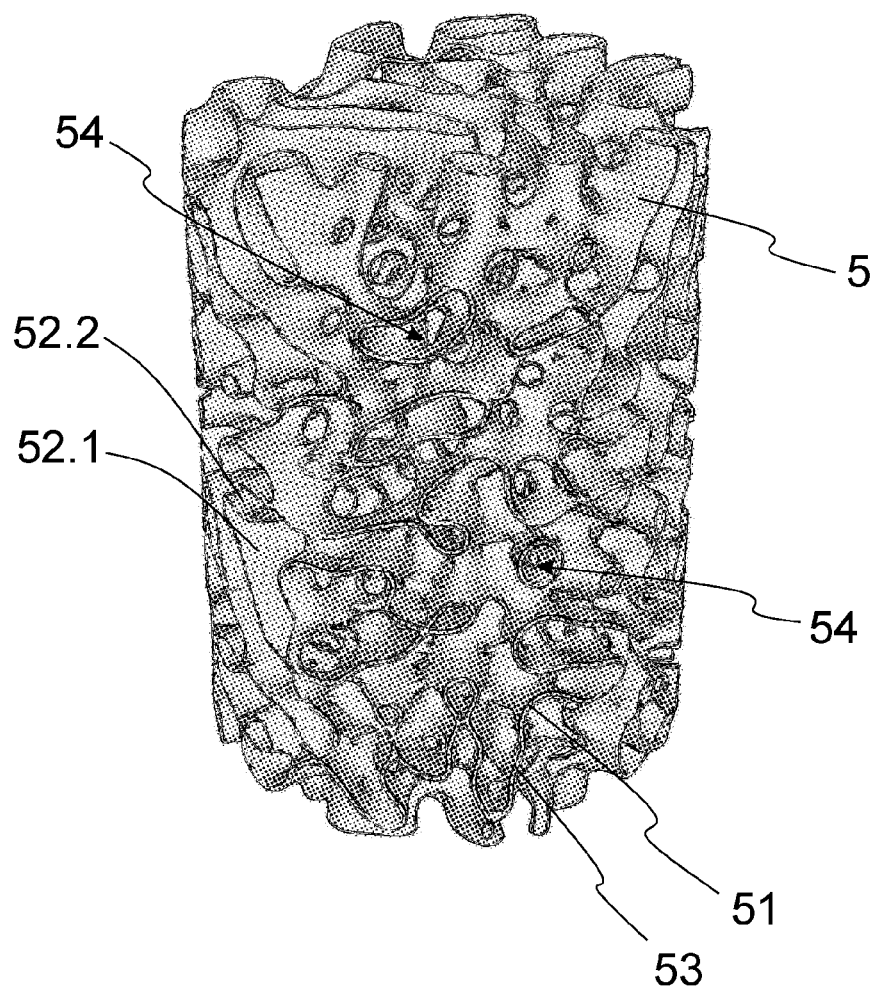
FIG. 12 shows a perspective view of a digital minimal surface model obtained from the minimal surface shape of FIG. 11.

FIG. 12 shows a perspective view of a digital minimal surface model 5 obtained from the minimal surface shape 3 of FIG. 11. The digital minimal surface model 5 comprises a wall 51 which has been generated by a pair of isosurfaces 52.1 and 52.2 which are generated to be equally spaced from the minimal surface shape 3 of FIG. 10. The distance between the isosurfaces 52.1 and 52.2 is equal to the wall width assigned to the minimal surface shape 3 of FIG. 10 such that the wall 51 exhibits said wall width. In this example, a constant global wall width has been applied. The isosurfaces 52.1 and 52.2 are connected by end faces 53. It is clear to the person skilled in the art that an illustration of an additively manufactured minimal surface structure according to the digital minimal surface model 5 would essentially look the same as the representation of the digital minimal surface model 5 as shown in FIG. 12. The minimal surface structure 3D printed according to the digital minimal surface model 5 may constitute the three-dimensional article. Alternatively, the three-dimensional article may comprise a shell which is arranged at the boundary of the minimal surface structure 3D printed according to the digital minimal surface model 5. The shell may close channels 54. In some non-limiting embodiments or aspects, the channels 54 may be closed by one of the methods described above.

Figure 13:
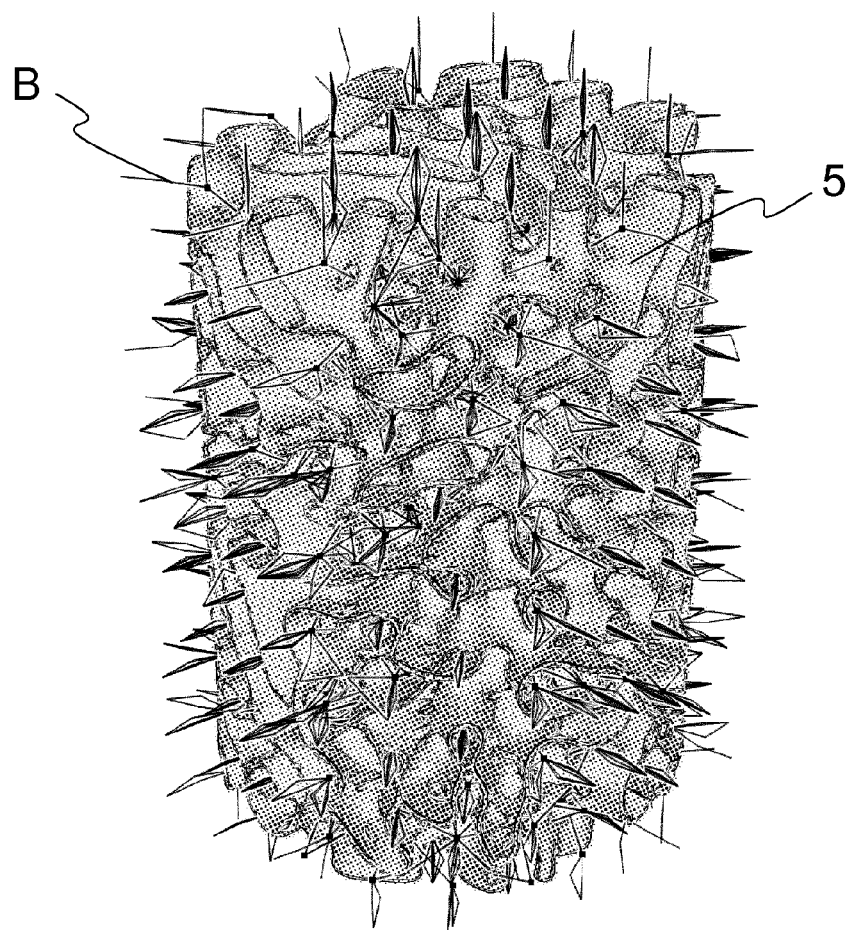
FIG. 13 shows a perspective view of the digital minimal surface of FIG. 12 with the second skeleton graph shown in addition.

FIG. 13 shows a perspective view of the digital minimal surface 5 of FIG. 12 with the second skeleton graph B shown in addition for illustrative purposes. The first skeleton graph has been omitted for improved representation.

Figure 14:
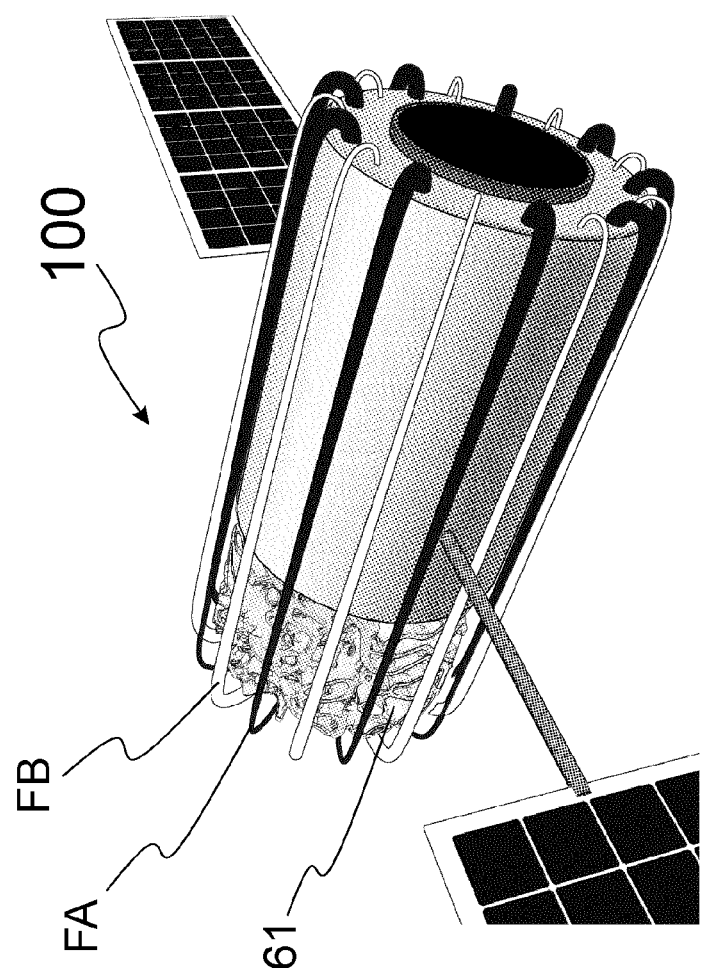
FIG. 14 shows a perspective view of a satellite chassis with a heat exchanger or heat equalizer as a three-dimensional article comprising an embodiment of a minimal surface structure.

FIG. 14 shows a perspective view of a satellite chassis 100 with a heat exchanger or heat equalizer as a three-dimensional article comprising an embodiment of a minimal surface structure 61 which has been additively manufactured according to non-limiting embodiments or aspects of the present disclosure. The minimal surface structure 61 of the satellite chassis 100 serves as a heat exchanger with a first heat transfer medium FA flowing through the black pipes and the first labyrinth of the minimal surface structure 61 associated with the first skeleton graph and a second heat transfer medium FB flowing through the white pipes and the second labyrinth of the minimal surface structure 61 associated with the second skeleton graph. The media FA and FB flow in opposite directions, thus providing a temperature equilibrium across the satellite chassis 100 (between sunlit and shaded areas) which allows for the reduction of stress and deformation of the chassis 100 due to temperature differences.

Figure 15:
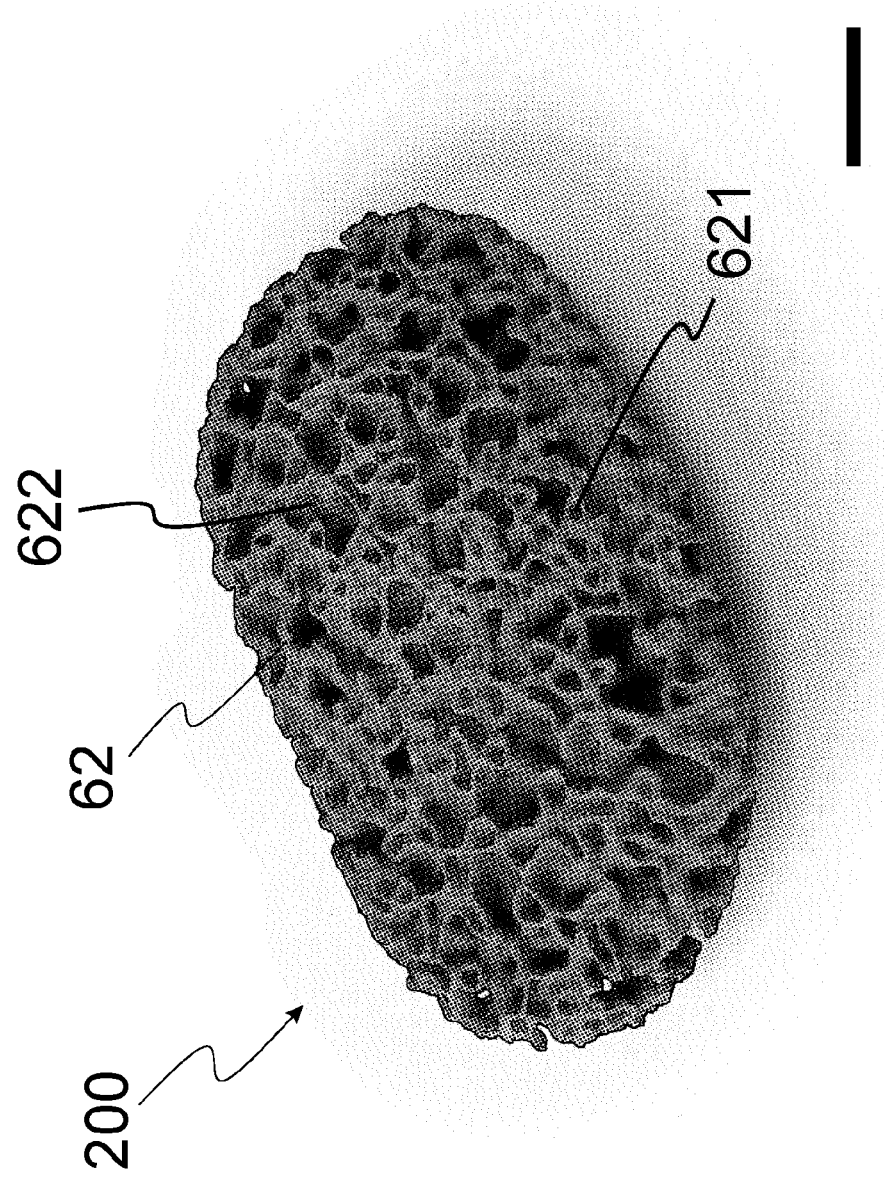
FIG. 15 shows a perspective view of a spinal cage as a three-dimensional article which is formed by an embodiment of a minimal surface structure.

FIG. 15 shows a perspective view of a spinal cage 200 as a three-dimensional article which is formed by an embodiment of a minimal surface structure 62 additively manufactured according to non-limiting embodiments or aspects of the present disclosure. The scale bar is 1 cm. Small peripheral channels 621 of the minimal surface structure 62 are optimized towards ideal bone ingrowth. Larger channels 622 serve for improving stability. The wall width of the minimal surface structure is 0.4 mm or less, depending on the capability of the 3D printer. For the shown example of the spinal cage 200, the ingrowth characteristics of the bone provides a set of local requirement values for the density field. Bone ingrowth is usually supported by the insertion of own, donor or artificial bone marrow into the spinal cage 200 prior to an implant surgery. For the case of a resorbable implant made of magnesium or a bioceramic like bTCP or HA, the resorption curve in connection with the mechanical load bearing capability provides a set of local requirement values for the density field. For example, the peripheral regions of the minimal surface structure 62 where bone contact arises are required to exhibit channel diameters between 0.8 and 1.2 mm in order to optimize bone ingrowth. Furthermore, for the shown spinal cage 200 which may be made of magnesium or a bioceramic, the walls in a central region of the minimal surface structure 62 are required to exhibit a sufficient wall width in order to ensure sufficient load bearing capability (for the case of bioceramic) and that over the time scale during which the bone ingrowth takes place, bioresorption removes only an amount of material for which the load bearing capability of the minimal surface structure 62 is safeguarded.

Figure 16C:
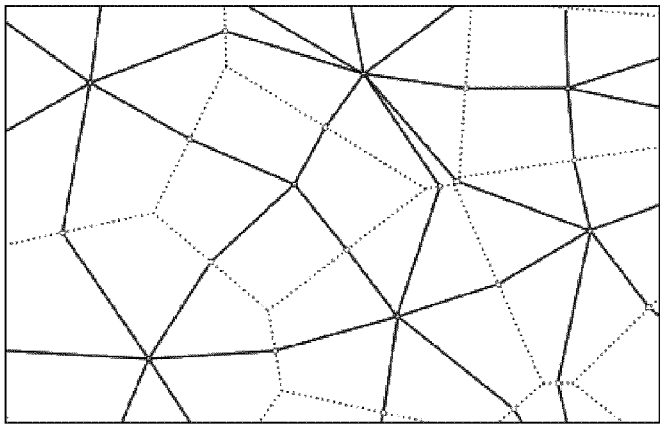
FIGS. 16(a)-(c) illustrate a sequence of steps where edges of a Delaunay tetrahedralization are corrected in order to adapt to a topological condition.
Figure 16B:
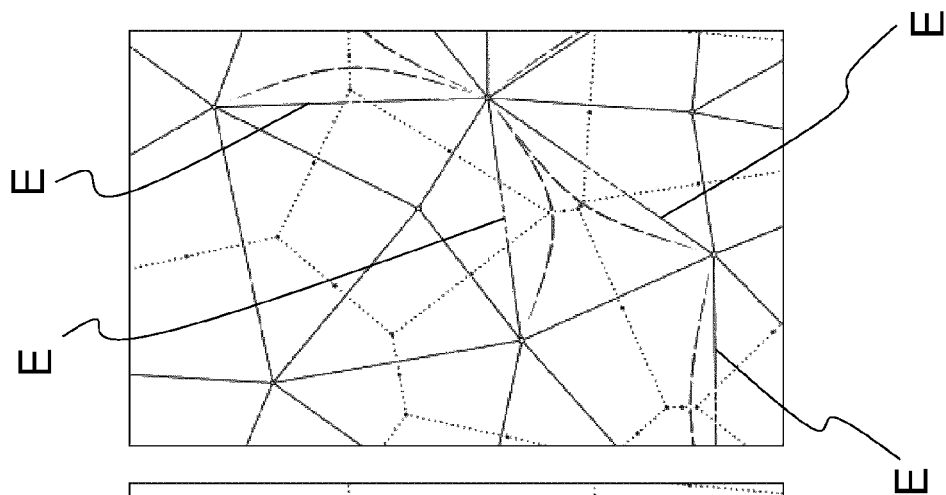
Figure 16A:
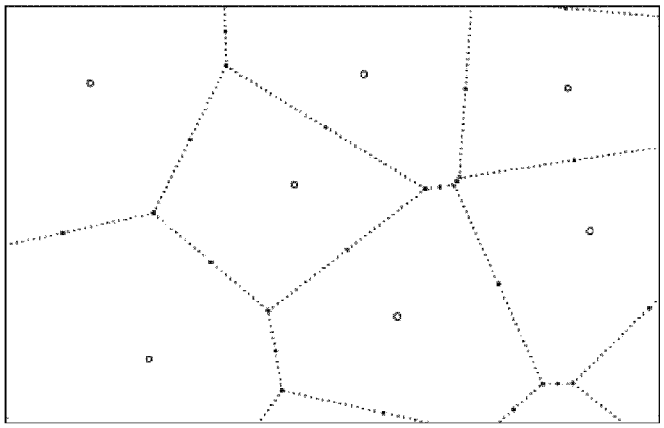

FIGS. 16(a)-(c) illustrate a sequence of steps where edges of a Delaunay tetrahedralization are corrected in order to adapt to a topological condition which uses segments of a second skeleton graph associated with the Delaunay tetrahedralization connecting generating points of neighboring Voronoi cells to only run within said neighboring Voronoi cells. For illustrative purposes, the FIGS. 16(a)-(c) are shown for a two-dimensional configuration. The person skilled in the art recognizes that the shown correction scheme can be translated to the three-dimensional case accordingly. FIG. 16(a) shows an adaptive Voronoi tessellation with Voronoi cells bounded by dotted lines with the generating points and points shown which mark the corners as well as midpoints of the edges of the Voronoi cells. FIG. 16(b) shows a Delaunay triangulation by connecting the generating points of the Voronoi cells by solid lines. The edges E denote edges of the Delaunay triangulation which do not satisfy the topological condition and have to be corrected according to the dashed curves. FIG. 16(c) shows the corrected Delaunay triangulation where the edges E of FIG. 16(b) have been replaced by edges making a detour and run through midpoints of edges of neighboring Voronoi cells according to the dashed curves of FIG. 16(b), such that the topological condition is met. The second skeleton graph obtained from the corrected Delaunay triangulation is essentially dual to the first skeleton graph obtained from the adaptive Voronoi tessellation.

Figure 17:
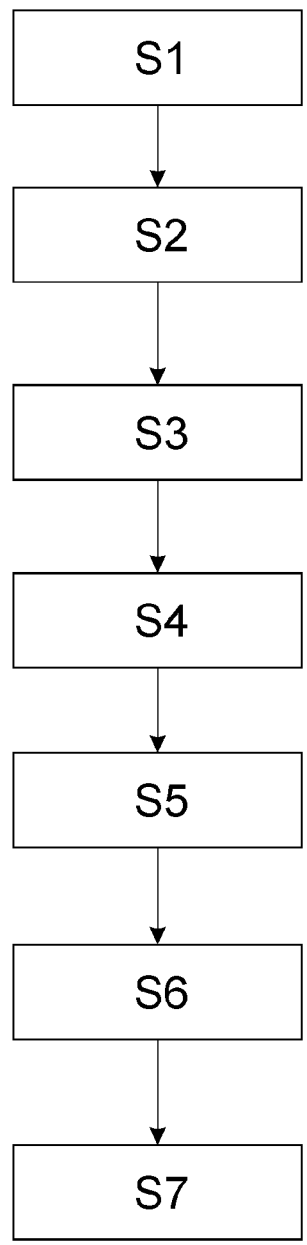
FIG. 17 shows a flow diagram illustrating non-limiting embodiments or aspects of a method of additively manufacturing a minimal surface structure of a three-dimensional article.

FIG. 17 shows a flow diagram illustrating non-limiting embodiments or aspects of a method of additively manufacturing a minimal surface structure of a three-dimensional article. In step S1, a computer records an envelope of the three-dimensional article in the computer. In step S2, the computer generates a density field across a volume enclosed by the envelope with densities of the density field corresponding to local requirement values of at least one physical parameter at respective positions of the three-dimensional article. In step S3, the computer generates an adaptive Voronoi tessellation of the volume using the density field. In step S4, the computer generates a first skeleton graph associated with the adaptive Voronoi tessellation. In step S5, the computer generates a second skeleton graph associated with the first skeleton graph. In step S6, the computer generates a digital minimal surface model from the first and second skeleton graphs. In step S7, a 3D printer additively manufactures the minimal surface structure according to the digital minimal surface model.

Figure 18:
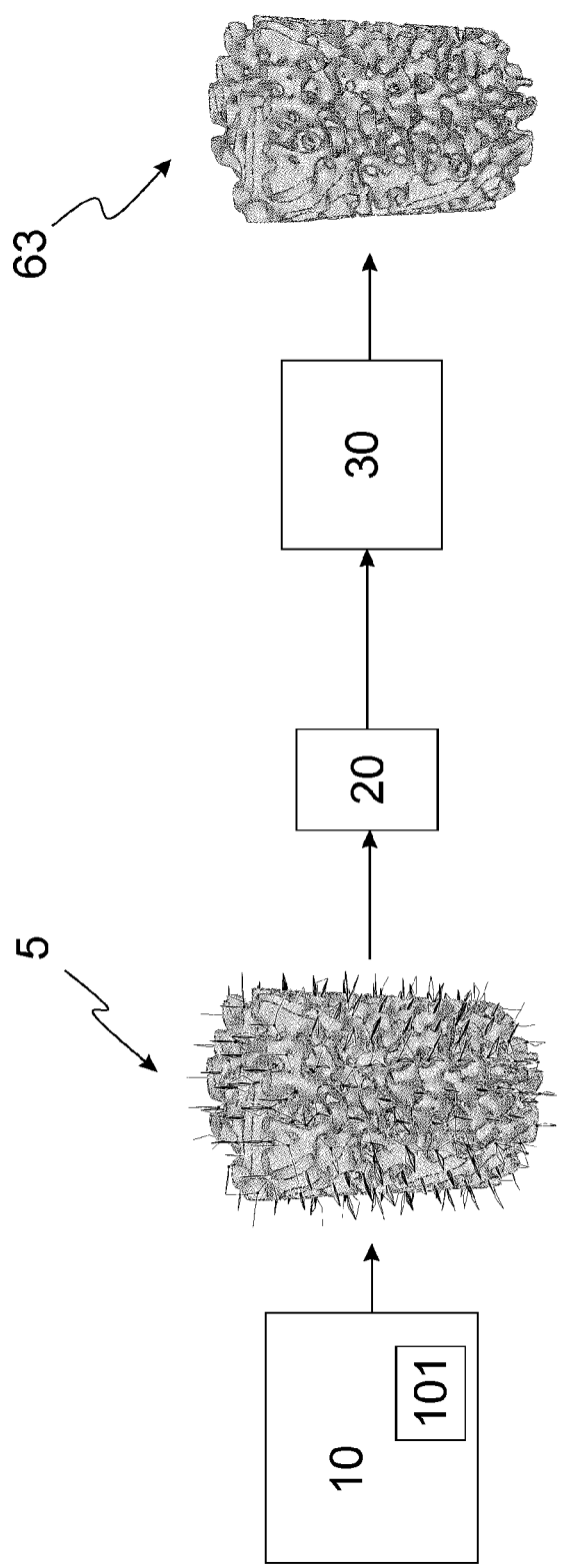
FIG. 18 shows a block diagram of non-limiting embodiments or aspects of a method of additively manufacturing a minimal surface structure of a three-dimensional article.

FIG. 18 shows a block diagram of non-limiting embodiments or aspects of a method of additively manufacturing a minimal surface structure of a three-dimensional article. First, a computer 10 with a non-transitory computer-readable medium 101, such as a storage, having stored thereon computer-executable instructions to execute a method as shown in FIG. 17, generates a digital minimal surface model 5. The digital minimal surface model 5 is stored as a CAD-file on a non-transitory computer-readable medium 20, such as a storage. Using the CAD-file, a 3D printer 30 prints the minimal surface structure 63 according to the digital minimal surface model 5.

Figure 19:
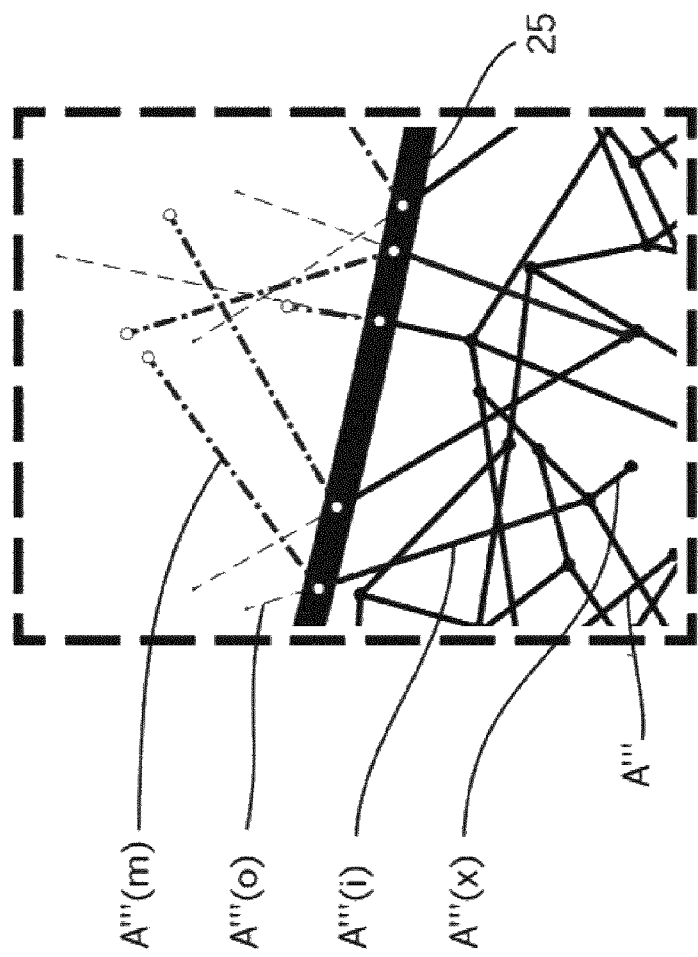
FIG. 19 shows an example of treating segments of the skeleton graphs traversing the envelope of the three-dimensional article.

FIG. 19 shows an example of treating segments of the skeleton graphs traversing the envelope of the three-dimensional article where from a segment of the first and/or second skeleton graph which traverses the envelope of the three-dimensional article, a first segment part lying outside the volume enclosed by the envelope is removed and replaced by a segment part which is obtained by mirror-imaging about the envelope at the position where the segment of the first and/or second skeleton graph traverses the envelope a second segment part lying inside the volume and adjoining the first segment part. As can be seen in FIG. 19, open end segments A''' (x), i.e. segments that do not connect to any further segments and end into void, have been removed. Further, from the outermost segment(s), i.e. segments that would traverse the skin 25 of the article, the parts A''' (o) outside of the skin are removed and replaced with a mirror image A''' (m) of the segment part A''' (i) inside the article, whereby the mirror image is a mirror image of the part inside which is mirrored about the skin 25, at the place where it is traversed by the segment. This ascertains that the resulting minimal surface structure touches the envelope 25 in essentially perpendicular direction, thus providing ideal load conduit.

The invention claimed is:

1. A method of additively manufacturing a minimal surface structure of a three-dimensional article, comprising:
   recording, with at least one processor, in a storage, an envelope of the three-dimensional article;
   generating, with the at least one processor, a density field across a volume enclosed by the envelope with densities of the density field corresponding to local requirement values of at least one physical parameter at respective positions of the three-dimensional article;
   generating, with the at least one processor, an adaptive Voronoi tessellation (VO) of the volume using the density field;
   generating, with the at least one processor, a first skeleton graph (A) associated with the adaptive Voronoi tessellation (VO), wherein the first skeleton graph (A) is formed by edges of Voronoi cells of the adaptive Voronoi tessellation (VO);
   generating, with the at least one processor, a second skeleton graph (B) associated with the first skeleton graph (A), wherein the second skeleton graph (B) is essentially dual to the first skeleton graph (A);
   generating, with the at least one processor, a digital minimal surface model from the first and second skeleton graphs (A; B), wherein generating the digital minimal surface model from the first and second skeleton graphs (A; B) comprises:
   generating a minimal surface precursor from the first and second skeleton graphs;
   generating a minimal surface shape by smoothening the minimal surface precursor;
   assigning a wall width to the minimal surface shape; and
   generating the digital minimal surface model according to the minimal surface shape and the assigned wall width; and
   additively manufacturing, with a 3D printer, the minimal surface structure according to the digital minimal surface model.

2. The method according to claim 1, wherein generating the adaptive Voronoi tessellation (VO) comprises:
   generating a set of scatter points corresponding to a distribution of the densities of the density field;
   randomly distributing the scatter points across the volume enclosed by the envelope; and
   generating a plurality of Voronoi cells of the adaptive Voronoi tessellation (VO) using the randomly distributed scatter points as generating points of the Voronoi cells.

3. The method according to claim 1, wherein generating the adaptive Voronoi tessellation (VO) using the density field comprises iteratively generating a plurality of Voronoi cells of the adaptive Voronoi tessellation (VO) by weighted stippling using the density field.

4. The method according to claim 3, wherein iteratively generating the plurality of Voronoi cells comprises iterating the steps of:
   a) calculating a weighted centroid (C) of each Voronoi cell using the density field and shifting generating points of the Voronoi cells to the respective centroids (C); and
   b) generating new Voronoi cells of the adaptive Voronoi tessellation (VO) using the shifted generating points and replacing the Voronoi cells of step a) by the new Voronoi cells;
   until the calculated centroids (C) conform with the generating points of the Voronoi cells in step a).

5. The method according to claim 4, wherein iteratively generating the plurality of Voronoi cells comprises executing the steps of:
   c) calculating for each Voronoi cell a cell weight by integrating the density field over the respective Voronoi cell;
   d) recording, in the storage, a first weight threshold and a second weight threshold, wherein the first weight threshold is larger than the second weight threshold; and
   e) splitting Voronoi cells with a cell weight above the first weight threshold and deleting Voronoi cells with a cell weight below the second weight threshold;
   after step b).

6. The method according to claim 5, wherein the steps c)-e) are executed for the first 10-30% of the iterations of steps a)-b).

7. The method according to claim 1, wherein generating the density field comprises:
   dividing the volume enclosed by the envelope into a plurality of voxels and generating at least one local requirement value for each voxel.

8. The method according to claim 1, wherein the second skeleton graph (B) is generated by Delaunay tetrahedralization of generating points of the adaptive Voronoi tessellation (VO).

9. The method according to claim 1, wherein from a segment of the first and/or second skeleton graph (A; B) which traverses the envelope of the three-dimensional article, a first segment part lying outside the volume enclosed by the envelope is removed and replaced by a segment part which is obtained by mirror-imaging about the envelope at the position where the segment of the first and/or second skeleton graph traverses the envelope a second segment part lying inside the volume and adjoining the first segment part.

10. The method according to claim 1, wherein Voronoi cells which extend beyond the envelope of the three-dimensional article are trimmed at the envelope and the centroids of the trimmed Voronoi cells are recalculated using the density field.

11. The method according to claim 1, wherein generating the digital minimal surface model from the first and second skeleton graphs (A; B) comprises:
    assigning a first electrical charge to the first skeleton graph (A);
    assigning a second electrical charge to the second skeleton graph (B), the second electrical charge being equal in absolute value, but opposite in sign to the first electrical charge; and
    generating the minimal surface precursor as an equipotential surface between the first and second skeleton graph (A; B) using a Coulomb force field calculated based on the first and second skeleton graphs (A; B) and their electrical charges.

12. The method according to claim 1, wherein the at least one physical parameter includes at least one of: mechanical load, stiffness, amount of storable fluid, fluid flow, heat transport, or any combination thereof.

13. A minimal surface structure additively manufactured by the method according to claim 1.

14. The minimal surface structure according to claim 13, wherein the minimal surface structure is a quasiperiodic structure.

15. The minimal surface structure according to claim 13, wherein the minimal surface structure is an amorphous structure.

16. A computer program product including a non-transitory computer-readable medium having stored thereon computer-executable instructions which, when executed by at least one processor of a 3D printer, cause the 3D printer to additively manufacture a minimal surface structure of a three-dimensional article according to a digital minimal surface model by:
    recording, in a storage, an envelope of the three-dimensional article;
    generating a density field across a volume enclosed by the envelope with densities of the density field corresponding to local requirement values of at least one physical parameter at respective positions of the three-dimensional article;
    generating an adaptive Voronoi tessellation (VO) of the volume using the density field;
    generating a first skeleton graph (A) associated with the adaptive Voronoi tessellation (VO), wherein the first skeleton graph (A) is formed by edges of Voronoi cells of the adaptive Voronoi tessellation (VO);
    generating a second skeleton graph (B) associated with the first skeleton graph (A), wherein the second skeleton graph (B) is essentially dual to the first skeleton graph (A); and
    generating the digital minimal surface model from the first and second skeleton graphs (A; B), wherein generating the digital minimal surface model from the first and second skeleton graphs (A; B) comprises:
    generating a minimal surface precursor from the first and second skeleton graphs;
    generating a minimal surface shape by smoothening the minimal surface precursor;
    assigning a wall width to the minimal surface shape; and
    generating the digital minimal surface model according to the minimal surface shape and the assigned wall width.

17. A computer-implemented method of generating a digital minimal surface model adapted for additively manufacturing a minimal surface structure of a three-dimensional article according to the digital minimal surface model by a 3D printer, the computer-implemented method comprising a computer executing the steps of:
    recording, in the computer, an envelope of the three-dimensional article;
    generating a density field across a volume enclosed by the envelope with densities of the density field corresponding to local requirement values of at least one physical parameter at respective positions of the three-dimensional article;
    generating an adaptive Voronoi tessellation (VO) of the volume using the density field;
    generating a first skeleton graph (A) associated with the adaptive Voronoi tessellation (VO), wherein the first skeleton graph (A) is formed by edges of Voronoi cells of the adaptive Voronoi tessellation (VO);
    generating a second skeleton graph (B) associated with the first skeleton graph (A), wherein the second skeleton graph (B) is essentially dual to the first skeleton graph (A);
    generating the digital minimal surface model from the first and second skeleton graphs (A; B), wherein generating the digital minimal surface model from the first and second skeleton graphs (A; B) comprises:
    generating a minimal surface precursor from the first and second skeleton graphs;
    generating a minimal surface shape by smoothening the minimal surface precursor;
    assigning a wall width to the minimal surface shape; and
    generating the digital minimal surface model according to the minimal surface shape and the assigned wall width; and
    storing the digital minimal surface model on a computer-readable medium.

18. A computer program product including a non-transitory computer readable medium comprising program instructions for generating a digital minimal surface model adapted for additively manufacturing a minimal surface structure of a three-dimensional article according to the digital minimal surface model by a 3D printer which, when executed by at least one processor, cause the at least one processor to:
    record an envelope of the three-dimensional article;
    generate a density field across a volume enclosed by the envelope with densities of the density field corresponding to local requirement values of at least one physical parameter at respective positions of the three-dimensional article;

generate an adaptive Voronoi tessellation (VO) of the volume using the density field;

generate a first skeleton graph (A) associated with the adaptive Voronoi tessellation (VO), wherein the first skeleton graph (A) is formed by edges of Voronoi cells of the adaptive Voronoi tessellation (VO);

generate a second skeleton graph (B) associated with the first skeleton graph (A), wherein the second skeleton graph (B) is essentially dual to the first skeleton graph (A);

generate the digital minimal surface model from the first and second skeleton graphs (A; B), wherein generating the digital minimal surface model from the first and second skeleton graphs (A; B) comprises:

generating a minimal surface precursor from the first and second skeleton graphs;

generating a minimal surface shape by smoothening the minimal surface precursor;

assigning a wall width to the minimal surface shape; and generating the digital minimal surface model according to the minimal surface shape and the assigned wall width; and store the digital minimal surface model on a computer-readable medium.

19. The method according to claim 7, wherein the plurality of voxels includes a plurality of tetrahedral voxels.

* * * * *